(12) United States Patent
Ono et al.

(10) Patent No.: US 9,170,896 B2
(45) Date of Patent: Oct. 27, 2015

(54) INFORMATION PROCESSING APPARATUS AND CONTROL METHOD FOR INFORMATION PROCESSING APPARATUS

(71) Applicant: FUJITSU LIMITED, Kawasaki-shi, Kanagawa (JP)

(72) Inventors: Takatsugu Ono, Kawasaki (JP); Mitsuru Sato, Paderborn (DE); Susumu Saga, Minato (JP)

(73) Assignee: FUJITSU LIMITED, Kawasaki (JP)

( * ) Notice: Subject to any disclaimer, the term of this patent is extended or adjusted under 35 U.S.C. 154(b) by 101 days.

(21) Appl. No.: 14/162,186

(22) Filed: Jan. 23, 2014

(65) Prior Publication Data

US 2014/0215264 A1  Jul. 31, 2014

(30) Foreign Application Priority Data

Jan. 30, 2013  (JP) ................. 2013-015567

(51) Int. Cl.
| | |
|---|---|
| *G06F 11/00* | (2006.01) |
| *G06F 11/20* | (2006.01) |
| *G06F 11/07* | (2006.01) |
| *G06F 11/10* | (2006.01) |
| *G06F 11/16* | (2006.01) |

(52) U.S. Cl.
CPC ........ *G06F 11/2028* (2013.01); *G06F 11/0721* (2013.01); *G06F 11/0751* (2013.01); *G06F 11/1008* (2013.01); *G06F 11/202* (2013.01); *G06F 11/2033* (2013.01); *G06F 11/2043* (2013.01); *G06F 11/1658* (2013.01); *G06F 11/1666* (2013.01); *G06F 11/20* (2013.01); *G06F 11/2038* (2013.01)

(58) Field of Classification Search
CPC .............. G06F 9/3001; G06F 11/2038; G06F 11/0721; G06F 11/202; G06F 11/2028; G06F 11/2033
See application file for complete search history.

(56) References Cited

U.S. PATENT DOCUMENTS

| | | | | |
|---|---|---|---|---|
| 5,696,983 | A * | 12/1997 | Watanabe et al. ................ | 712/29 |
| 2004/0221193 | A1 | 11/2004 | Armstrong et al. | |
| 2008/0222336 | A1* | 9/2008 | Kiyoshige et al. ............ | 710/305 |
| 2011/0078542 | A1* | 3/2011 | Imafuku et al. ................ | 714/763 |
| 2013/0007514 | A1* | 1/2013 | Takatsudo et al. .............. | 714/11 |
| 2013/0124019 | A1* | 5/2013 | Fukui et al. ........................ | 701/3 |
| 2013/0177119 | A1* | 7/2013 | Kiuchi et al. .................. | 376/215 |
| 2014/0019726 | A1* | 1/2014 | Toi et al. ........................ | 712/221 |

FOREIGN PATENT DOCUMENTS

JP  2004-318885  11/2004

* cited by examiner

Primary Examiner — Charles Ehne
(74) Attorney, Agent, or Firm — Staas & Halsey LLP

(57) ABSTRACT

An information processing apparatus includes a switch unit configured to connect some of the arithmetic processing devices and some of the storage devices in accordance with connection information, a first control unit being configured to output physical information converted from the logical information of the arithmetic processing device at the transmission destination and the physical information of the corresponding arithmetic processing device via a transfer path in accordance with the correlation information, a second control unit configured to change the connection information in response to occurrence of a failure of some arithmetic processing device in the system, and to control the switch unit such that the failed arithmetic processing device is replaced with another one included in the plural arithmetic processing devices.

10 Claims, 19 Drawing Sheets

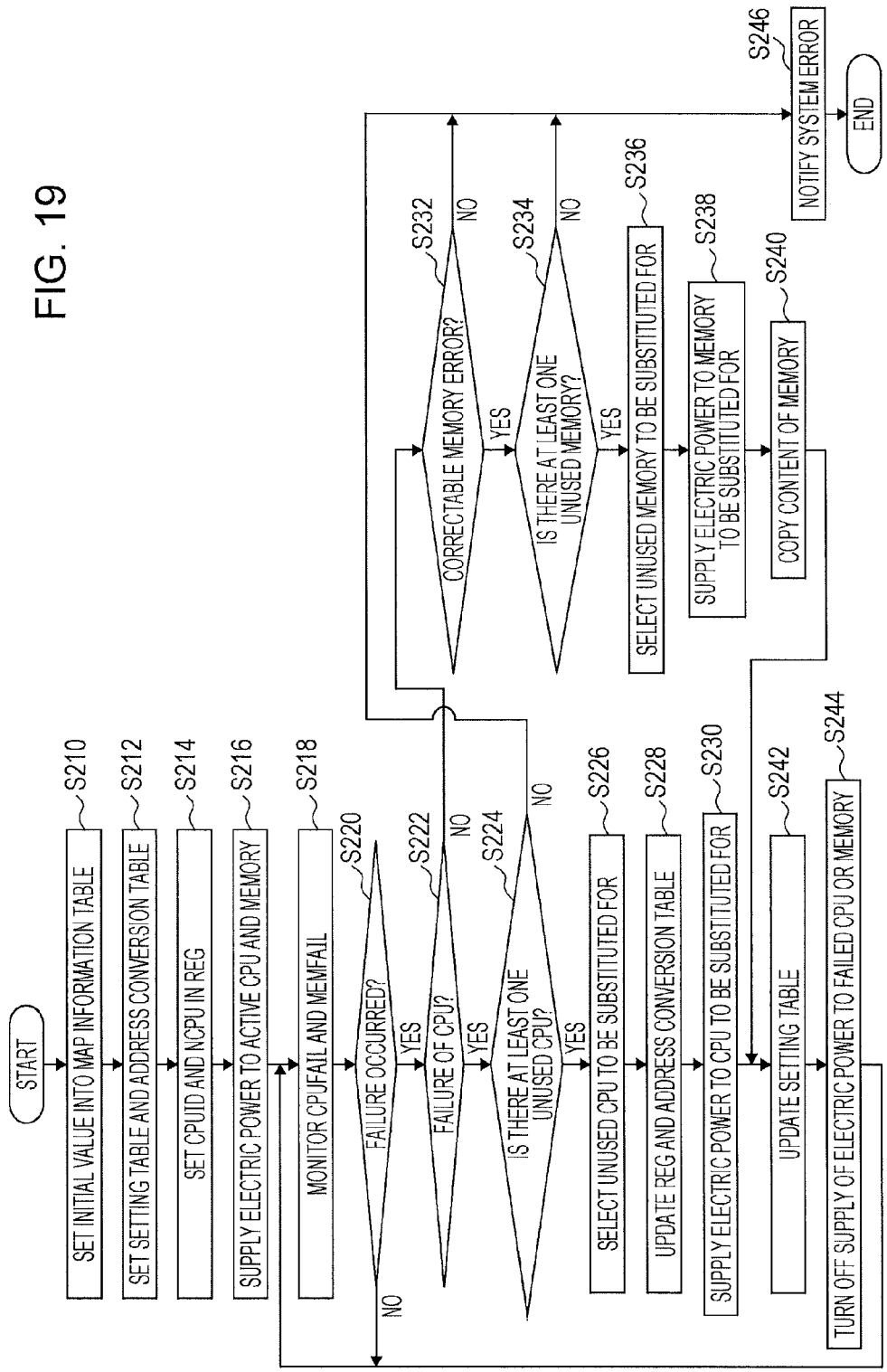

INFORMATION PROCESSING APPARATUS AND CONTROL METHOD FOR INFORMATION PROCESSING APPARATUS

CROSS-REFERENCE TO RELATED APPLICATION

This application is based upon and claims the benefit of priority from the prior Japanese Patent Application No. 2013-015567, filed on Jan. 30, 2013, the entire contents of which are incorporated herein by reference.

FIELD

The embodiments discussed herein are related to an information processing apparatus and a control method for the information processing apparatus.

BACKGROUND

In relation to a system including a plurality of arithmetic processing devices, such as central processing units (CPUs), there is proposed a method of detecting a failure of any of the arithmetic processing devices and replacing the failed arithmetic processing device with another arithmetic processing device (see, for example, Japanese Laid-open Patent Publication No. 2004-318885).

When the failed arithmetic processing device is replaced with another arithmetic processing device, physical connections of those arithmetic processing devices are changed. Accordingly, the system changes information, such as numbers, specifically assigned to the relevant arithmetic processing devices, and makes each arithmetic processing device recognize the changed information, thus enabling communication to be performed between the arithmetic processing devices after the replacement of the failed arithmetic processing device. In other words, when the failed arithmetic processing device is replaced with another one, information set in each of the arithmetic processing devices within the system is updated.

SUMMARY

According to an aspect of the invention, an information processing apparatus includes a plurality of arithmetic processing devices each configured to execute arithmetic operations, a plurality of storage devices each configured to store data, a switch unit configured to connect some of the plural arithmetic processing devices and some of the plural storage devices in accordance with connection information, and to construct a system, a storage unit configured to store correlation information indicating correspondence between physical information that individually identifies the plural arithmetic processing devices, and logical information that identifies each of the plural arithmetic processing devices in the system, a first control unit disposed corresponding to each of the plural arithmetic processing devices, the first control unit being configured to, when the corresponding arithmetic processing device transmits data to the arithmetic processing device at a transmission destination, output physical information converted from the logical information of the arithmetic processing device at the transmission destination and the physical information of the corresponding arithmetic processing device via a transfer path in accordance with the correlation information, a second control unit configured to change the connection information in response to occurrence of a failure of some arithmetic processing device in the system, and to control the switch unit such that the failed arithmetic processing device is replaced with another one included in the plural arithmetic processing devices, and a third control unit configured to, in response to the occurrence of the failure, invalidate the correlation information that includes the logical information corresponding to the physical information of the failed arithmetic processing device, and to set correspondence between the physical information of the other arithmetic processing device and the logical information contained in the invalidated correlation information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 18 illustrates an example of operations of the CPUs, illustrated in FIG. 3, upon power-on; and FIG. 19 illustrates an example of operation of the configuration control unit illustrated in FIG. 5.

DESCRIPTION OF EMBODIMENTS

Hereinafter, the embodiments will be described with reference to the drawings.

Figure 1:
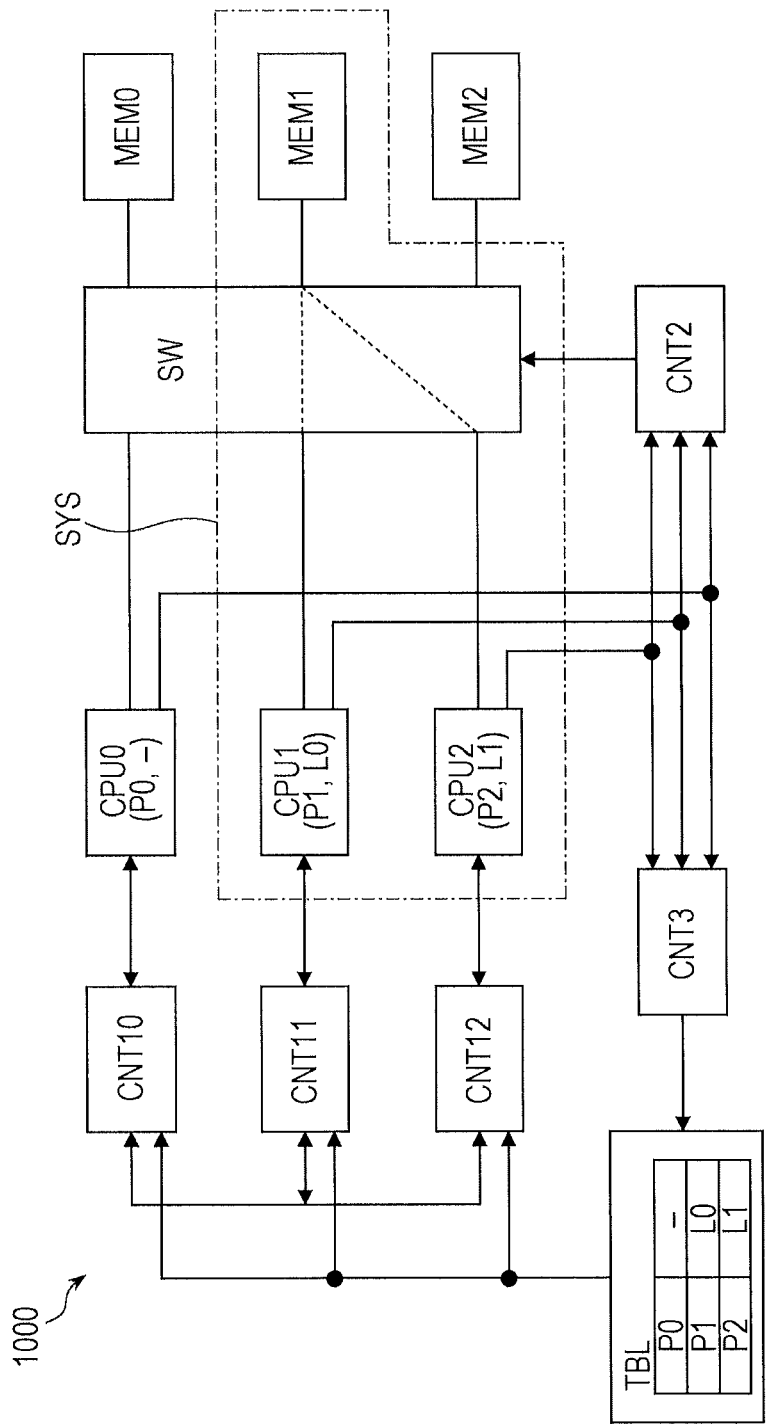
FIG. 1 illustrates an example of an information processing apparatus according to one embodiment.

FIG. 1 illustrates an example of an information processing apparatus according to one embodiment. An information processing apparatus 1000 includes CPUs (CPU0, CPU1, and CPU2), memories MEM (MEM0, MEM1, and MEM2), a switch unit SW, a table TBL, and control units CNT1 (CNT10, CNT11, and CNT12), CNT2, and CNT3. The CPU is one example of an arithmetic processing apparatus configured to execute arithmetic operations, and the memory MEM is one example of a storage device configured to store data. The control unit CNT1 is one example of a first control unit, the control unit CNT2 is one example of a second control unit, and the control unit CNT3 is one example of a third control unit. For example, the CPU is a general-purpose CPU, and the memory MEM is a general-purpose memory.

The switch unit SW connects at least one of the CPU0 to CPU2 and at least one of the memories MEM0 to MEM2 in accordance with connection information, thereby constructing a system. Connection specifications are provided as information indicating how the at least one CPU and the at least one memory MEM are connected. In FIG. 1, as denoted by dotted lines within a block of the switch unit SW, the CPU1 and the CPU2 are connected to the memory MEM1 through the switch unit SW in accordance with the connection specifications. Thus, a computer system SYS is constructed by the CPU1, CPU2, and the memory MEM1.

A physical number P# (# is any one of 0, 1, and 2), which is a specific number within the information processing apparatus 1000, is assigned to each CPU. A logical number L# (# is any one of 0 and 1), which is a virtual number, is assigned to each of the CPU1 and the CPU2 in the computer system SYS. The physical number P# is one example of physical information to identify the CPU in the information processing apparatus 1000, and the logical number L# is one example of logical information to identify the CPU in the computer system SYS. In FIG. 1, a symbol "-" attached to the CPU0 indicates that the CPU0 is unused, and that it is included in the information processing apparatus 1000, but not included in the computer system SYS.

The table TBL stores correlation information representing correspondences between the physical numbers P0, P1 and P2 assigned respectively to the CPU0 to the CPU2 and the logical numbers L0 and L1 assigned respectively to the CPU1 and the CPU2 in the computer system SYS. The table TBL is one example of a storage unit configured to store, as correlation information, the correspondence between the physical number P# and the logical number L#. The table TBL is stored, for example, in a memory device such as a dynamic random access memory (DRAM) or a static random access memory (SRAM). The connection information may be stored as a table in the storage device storing the table TBL.

The control units CNT10 to CNT12 are disposed corresponding to the CPU0 to the CPU2, respectively. Each of the control units CNT10 to CNT12 executes mutual conversion between the logical number L# and the physical number P# in the process of communication among the CPUs included in the computer system SYS.

For example, when data is transmitted from the CPU1 to the CPU2, the CPU1 at a transmission source outputs the logical number L1, which indicates the CPU2 at a transmission destination, to the control unit CNT11 together with data. The control unit CNT11 converts the logical number L1 indicating the transmission destination to the physical number P2 in accordance with the correlation between the physical number P# and the logical number L#, the correlation being stored in the table TBL. The control unit CNT11 further outputs the converted physical number P2 to an internal bus IBUS together with the physical number P1 indicating the CPU 1 at the transmission source. The internal bus IBUS is one example of a transfer path.

The control unit CNT12 corresponding to the CPU2 at the transmission destination receives, via the internal bus IBUS, the physical number P1 indicating the CPU1 at the transmission source and the physical number P2 indicating the CPU2 at the transmission destination. When the physical number P# as the transmission designation is P0 or P1, the control unit CNT12 does not receive information that is transferred to the transfer path IBUS.

The control unit CNT12 converts the physical number P1 indicating the transmission source to the logical number L0 in accordance with the correlation between the physical number P# and the logical number L#, the correlation being stored in the table TBL. The control unit CNT12 further outputs the converted logical number L0 to the CPU2. The CPU2 recognizes that it has received data from the CPU (CPU1 in the illustrated example) to which the logical number L0 is assigned, and executes data processing using the received data.

When each of the control units CNT10 to CNT12 includes a storage unit, such as a register or a buffer, for holding the received data and the logical number L# indicating the transmission source, the CPU2 may read the data and the logical number L#, which are held by the control unit CNT12. In that case, upon receiving the data, for example, the control unit CNT12 writes information indicating the reception of the data into a predetermined bit in the storage unit. The CPU2 is able to recognize the reception of the data by polling the predetermined bit in the storage unit of the control unit CNT12.

The data communicated among the CPUs may be transferred via the control units CNT10 to CNT12 and the internal bus IBUS, or may be transferred via the internal bus IBUS without passing the control units CNT10 to CNT12.

On the other hand, when information is transmitted from the CPU2 to the CPU1, the CPU2 at a transmission source outputs the logical number L0, which indicates the CPU1 at a transmission destination, to the control unit CNT12 as in the above-described case. The control unit CNT12 converts the logical number L0 to the physical number P1 in accordance with the information stored in the table TBL, and further outputs the converted physical number P1 to the transfer path IBUS together with the physical number P2 indicating the CPU2 at the transmission source.

The control unit CNT11 receives, via the transfer path IBUS, the physical number P1 indicating the transmission destination and the physical number P2 indicating the transmission source. When the physical number P# as the transmission designation is P0 or P2, the control unit CNT11 does not receive information that is transferred to the transfer path IBUS.

The control unit CNT11 converts the physical number P2 indicating the transmission source to the logical number L1 in accordance with the information stored in the table TBL, and further outputs the converted logical number L1 to the CPU1. The CPU1 recognizes that it has received data from the CPU (CPU2 in the illustrated example) to which the logical number L1 is assigned, and executes data processing using the received data.

When the occurrence of a failure of the CPU1 (or the CPU2) in the computer system SYS is detected, the control unit CNT2 changes the connection information. With the change of the connection information, the switch unit SW cancels the connection between the failed CPU1 (or CPU2) and the memory MEM1, and connects, for example, the unused CPU0 to the memory MEM1. As a result, the failed CPU1 (or CPU2) is replaced with another CPU (for example, the CPU0). In other words, the control unit CNT2 controls the switch unit SW in accordance with the changed connection information such that the failed CPU is replaced with the other CPU. The failure of the CPU may be detected by the control unit CNT2 based on information from the relevant CPU, or may be detected by a detection unit for detecting a failure of the CPU. An example of the function and the operation of the control unit CNT3 will be described below with reference to FIG. 2.

Figure 2:
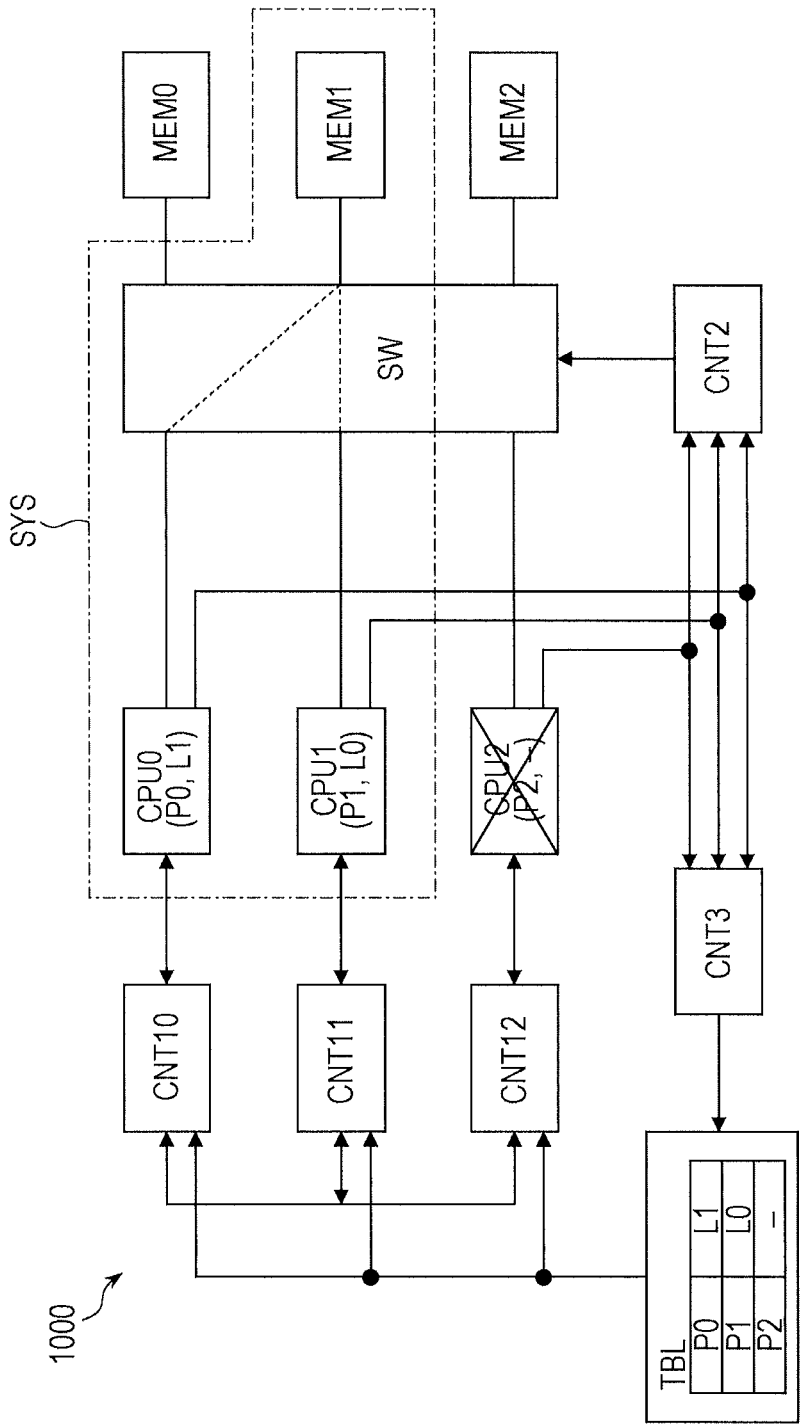
FIG. 2 illustrates an example in which a failed CPU is replaced with an unused CPU in the information processing apparatus illustrated in FIG. 1.

FIG. 2 illustrates an example in which a failed CPU2 is replaced with an unused CPU0 in the information processing apparatus 1000 illustrated in FIG. 1.

As described above with reference to FIG. 1, the control unit CNT2 controls the switch unit SW in accordance with the changed connection information, thus canceling the connection between the failed CPU2 and the memory MEM1 and connecting the unused CPU0 to the memory MEM1. As a result, the failed CPU2 is replaced with the other CPU0, and the computer system SYS having a new connection relation is constructed.

The control unit CNT3 rewrites the table TBL in accordance with the connection information that has been changed upon the occurrence of the failure of the CPU1 (or the CPU2) in the computer system SYS. For example, when the CPU2 is failed, the control unit CNT3 invalidates the logical number L# (L1 in the illustrated example) that corresponds to the physical number P2 indicating the CPU2, and writes the invalidated logical number L# (L1 in the illustrated example) in an area of the logical number that corresponds to the physical number P0 indicating the CPU0. Stated in another way, the control unit CNT3 invalidates the correlation information indicating the correspondence between the physical number P2 assigned to the failed CPU2 and the logical number L1, and sets correspondence between the logical number L1, which has been assigned to the failed CPU2, and the physical number P0 assigned to the CPU0.

Therefore, the communication executed between the CPU1 and the CPU2 corresponding respectively to the logical numbers L0 and L1 before the failure of the CPU2 is executable between the CPU1 and the CPU0 even after the failure of the CPU2 without changing the logical numbers L0 and L1. Thus, in this embodiment, since the physical number P# is not used in the communication between the CPUs in the computer system SYS, the setting of the CPUs in the computer system SYS is maintained continuously before and after the CPU replacement due to the failure. For example, programs executed by the CPUs are continuously executable without being changed, and the communication between the CPUs is allowed through the same procedures before and after the CPU replacement.

Accordingly, in the information processing apparatus 1000, the failed CPU is automatically replaceable with the unused CPU without resorting control and manipulation applied from the outside. Hence reliability of the information processing apparatus 1000 is improved in comparison with that of the related art. Since the information processing apparatus 1000 becomes operable as a maintenance-free embedded system, it may be installed, for example, at the bottom of the sea, deep in the mountain, or in the space where maintenance is difficult to perform manually. Furthermore, since the failed CPU is automatically replaced with the unused CPU, the reliability of the information processing apparatus 1000 is improved in comparison with that of the related art even when a general-purpose CPU is used.

Figure 3:
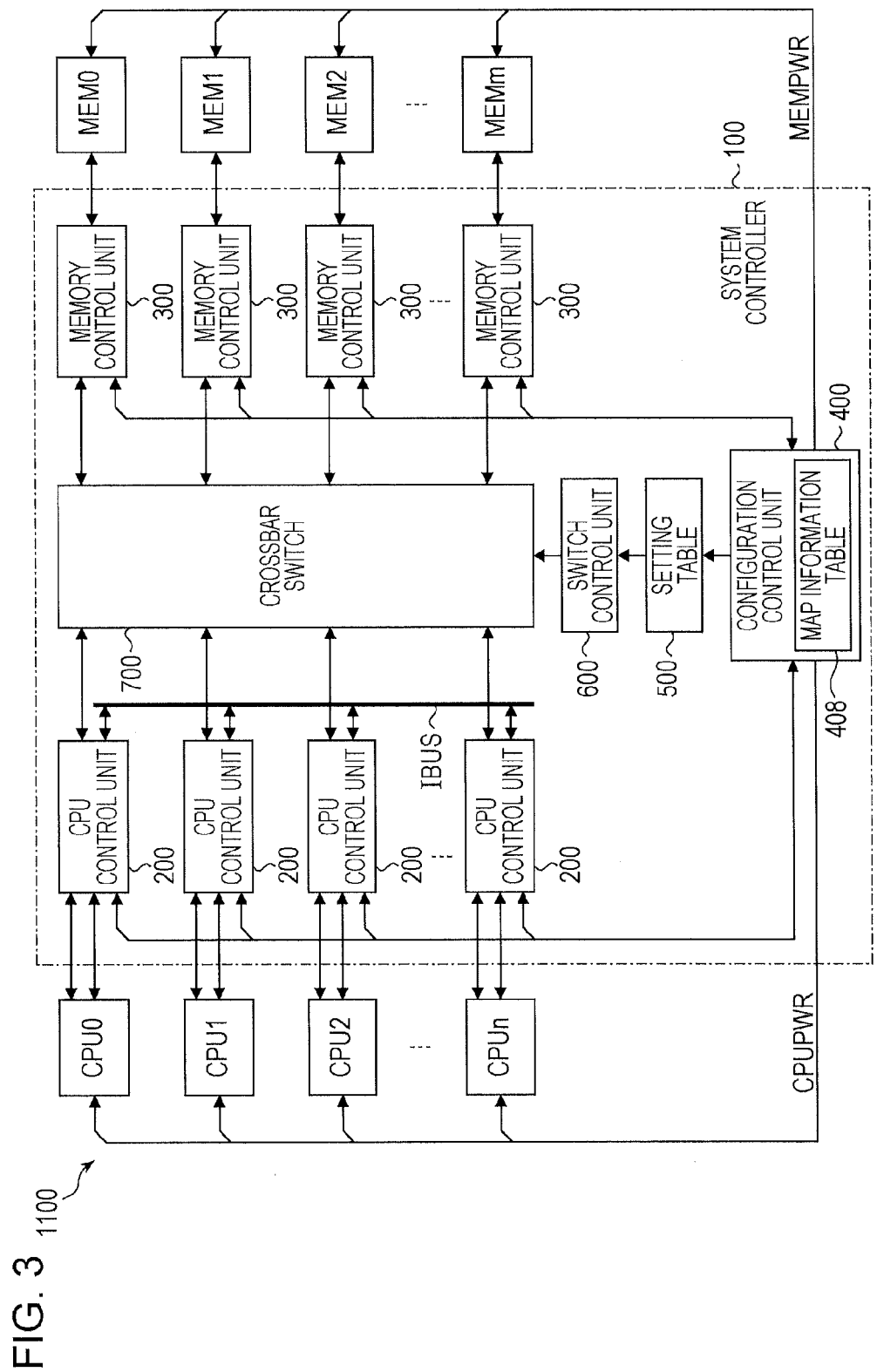
FIG. 3 illustrates an example of an information processing apparatus according to another embodiment.

FIG. 3 illustrates an example of an information processing apparatus according to another embodiment. Elements in FIG. 3 similar to or same as those described in the embodiment illustrated in FIG. 1 are denoted by the same reference symbols, and detailed description of those elements is omitted.

An information processing apparatus 1100 of this embodiment includes, for example, a plurality of CPUs, a plurality of memories MEM, and a system controller 100 for controlling the CPUs and the memories MEM. The information processing apparatus 1100 operates as a system with the CPUs executing programs. For example, the information processing apparatus 1100 includes a number (n+1) (n: positive integer) of CPUs (CPU0, CPU1, CPU2, . . . , CPUn) and a number (m+1) (m: positive integer) of memories MEMs (MEM0, MEM1, MEM2, . . . , MEMm).

For example, the CPU is a general-purpose CPU, and the memory MEM is a general-purpose memory, such as a flash memory, a ferroelectric memory, a DRAM, or a SRAM. When a rewritable nonvolatile memory, such as the flash memory or the ferroelectric memory is employed as the memory MEM, the programs to be executed by the CPU may be stored in the memory MEM before startup of the information processing apparatus 1100. On the other hand, when the DRAM or the SRAM is employed as the memory MEM, the information processing apparatus 1100 may include a read only memory (ROM) for previously storing the programs to be executed by the CPU. In the latter case, the system controller 100 transfers the programs to at least any one of the memories MEM from the ROM in an initial sequence at the startup of the information processing apparatus 1100.

The information processing apparatus 1100 becomes operable as the maintenance-free embedded system by employing the rewritable nonvolatile memory or by employing the DRAM or the SRAM and the ROM in a combined manner. Hence the information processing apparatus 1100 may be installed, for example, at the bottom of the sea, deep in the mountain, or in the space where maintenance is difficult to perform manually. For example, the information processing apparatus 1100 is used to control various sensors installed at the bottom of the sea, and to control various sensors mounted in base stations of communication equipment, relay devices for broadcasting equipment, artificial satellites, and unmanned reconnaissance planes. In other words, the information processing apparatus 1100 may include various sensors, input devices such as a camera, and interfaces thereof in addition to the components illustrated in FIG. 3.

The CPU0 to the CPUn, the memories MEM0 to MEMm, and the system controller 100 are, for example, in the form of separate semiconductor chips, and the information processing apparatus 1100 includes a substrate on which those semiconductor chips are mounted. The information processing apparatus 1100 may be a semiconductor chip of the multi-core type incorporating a plurality of processor cores, or a semiconductor chip incorporating a plurality of memories MEM. Furthermore, the information processing apparatus 1100 may include, instead of the CPU, a processor, such as a digital signal processor (DSP) or a graphics processing unit (GPU), which operates with execution of a program.

The system controller 100 includes a plurality of CPU control units 200 connected respectively to the CPUs, a plurality of memory control units 300 connected respectively to the memories MEM, a configuration control unit 400, a setting table 500, a switch control unit 600, and a crossbar switch 700. The crossbar switch 700 is one example of a switch unit that constructs at least one computer system by connecting at least one of the CPUs and at least one of the memories MEM.

Figure 4:
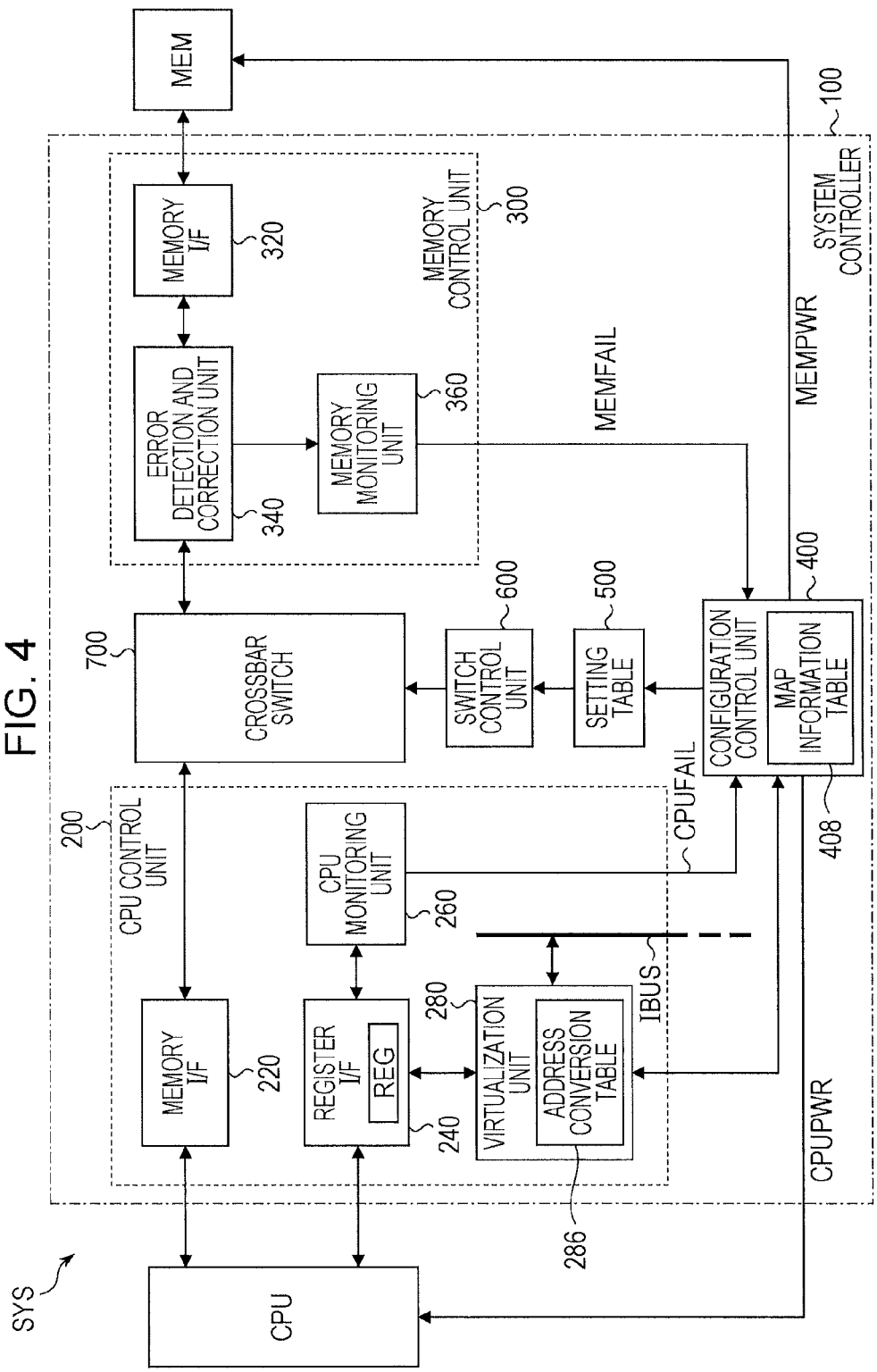
FIG. 4 illustrates respective examples of a CPU control unit and a memory control unit illustrated in FIG. 3.

Each CPU control unit 200 controls information, such as data, transferred between the corresponding CPU and the memory MEM connected to the relevant CPU via the crossbar switch 700. Furthermore, each CPU control unit 200 controls information, such as data, transferred between the CPUs via the internal bus IBUS, and monitors the operation of the corresponding CPU, to thereby detect a failure of the relevant CPU. An example of the CPU control unit 200 is illustrated in FIG. 4.

Each memory control unit 300 controls access to the corresponding memory MEM, and monitors the operation of the corresponding memory MEM, to thereby detect a failure of the relevant memory MEM. An example of the memory control unit 300 is illustrated in FIG. 4.

The configuration control unit 400 has the function of replacing a failed CPU with a spare CPU and the function of replacing a failed memory MEM with a spare memory MEM in the computer system under operation. For example, the configuration control unit 400 includes a processor such as a CPU, and realizes the function of replacing a failed CPU with a spare CPU and the function of replacing a failed memory MEM with a spare memory MEM by the processor executing a control program.

The configuration control unit 400 receives CPU error information indicating a failure of some CPU from the CPU control unit 200, and receives memory error information indicating a failure of some memory MEM from the memory control unit 300. The configuration control unit 400 rewrites the map information table 408 in accordance with the CPU error information or the memory error information. As a result, the failed CPU is replaced with the spare CPU, and the failed memory MEM is replaced with the spare memory MEM. The content of the map information table 408 is stored, for example, in a memory device incorporated in the system controller 100.

Figure 5:
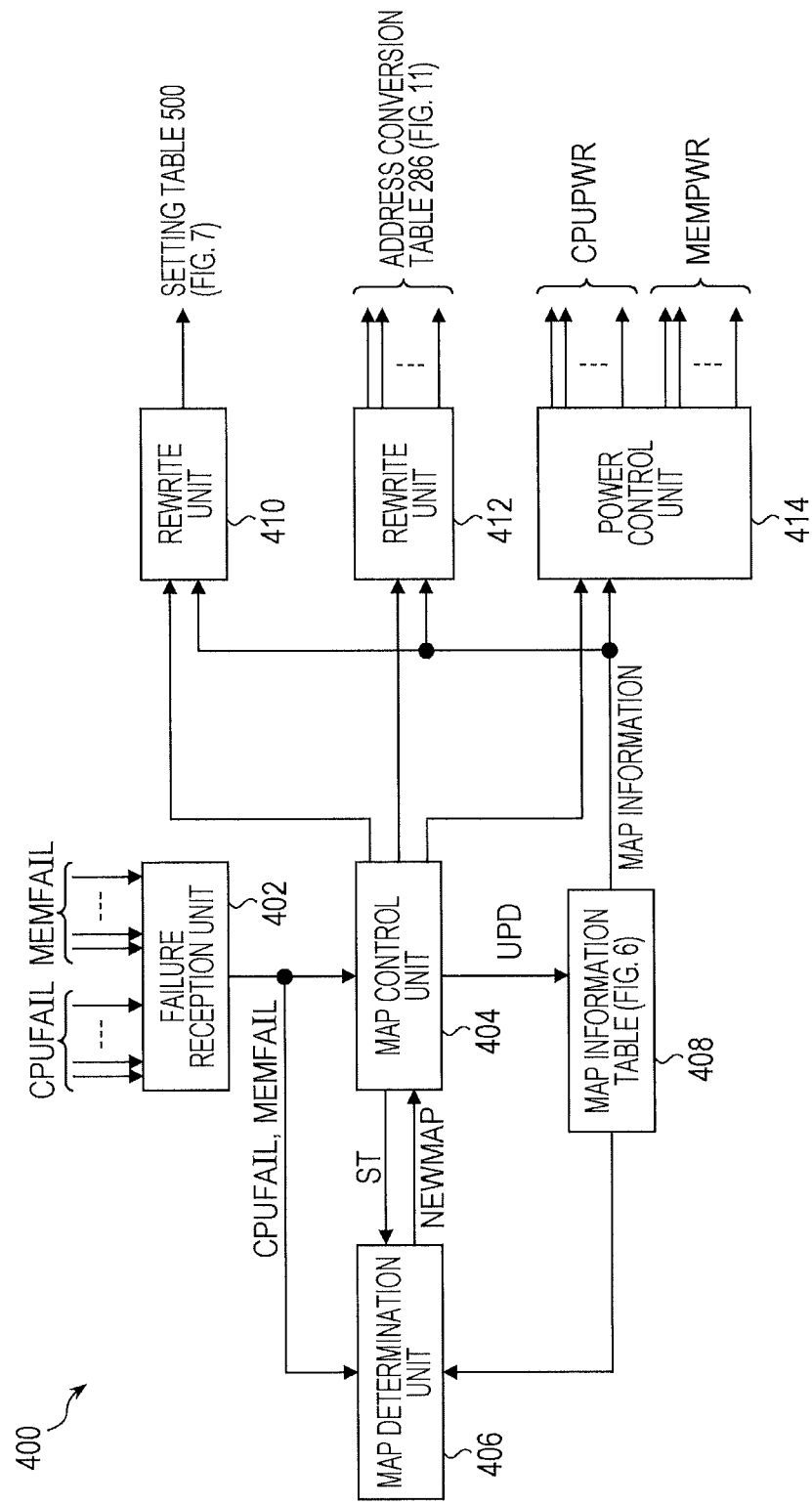
FIG. 5 illustrates an example of a configuration control unit illustrated in FIG. 4.

In accordance with the updated map information table 408, the configuration control unit 400 further controls the CPU control unit 200 and controls supply of electric power to each CPU and each memory MEM. For example, the configuration control unit 400 outputs, to each CPU, control information CPUPWR for controlling on/off of electric power supplied to each CPU, and outputs, to each memory MEM, control information MEMPWR for controlling on/off of electric power supplied to each memory MEM. An example of the configuration control unit 400 is illustrated in FIG. 5.

The setting table 500 is rewritable by the configuration control unit 400, and it stores map information output from the configuration control unit 400. The map information represents connection specifications for the CPUs and the memories MEM, which are operated as the computer system. The content of the setting table 500 is stored, for example, in a memory device incorporated in the system controller 100.

Figure 8:
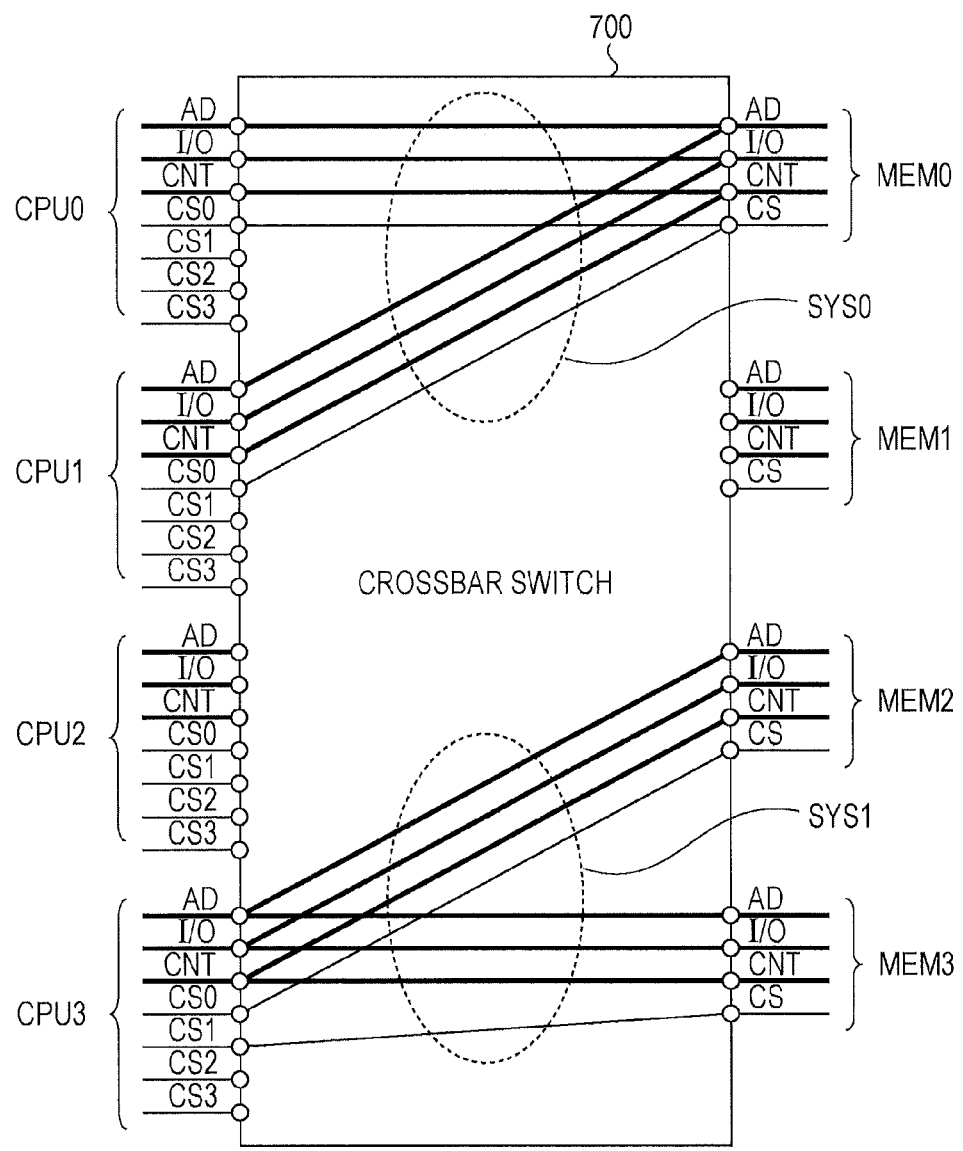
FIG. 8 illustrates an example of a crossbar switch illustrated in FIG. 3.

The switch control unit 600 connects at least one of the CPUs and at least one of the memories MEM by changing over the crossbar switch 700 in accordance with the map information set in the setting table 500. An example of the crossbar switch 700 is illustrated in FIG. 8.

FIG. 4 illustrates respective examples of the CPU control unit 200 and the memory control unit 300 illustrated in FIG. 3. For the sake of simplifying the description, FIG. 4 illustrates the CPU control unit 200 connected to one CPU and the memory control unit 300 connected to one memory MEM. The CPU control units 200 connected to the other CPUs and the memory control units 300 connected to the other memories MEM also have the same or similar configurations as or to those illustrated in FIG. 4.

The CPU control unit 200 includes a memory interface (I/F) 220, a register I/F 240, a CPU monitoring unit 260, and a virtualization unit 280 connected to the internal bus IBUS.

The memory I/F 220 receives, for example, not only an address for accessing the memory MEM, the address being output from the CPU, but also a control signal and a write data, and outputs the received address, control signal, and write data to the crossbar switch 700. Furthermore, the memory I/F 220 receives read data supplied from the memory MEM via the crossbar switch 700, and outputs the received read data to the CPU.

Figure 9:
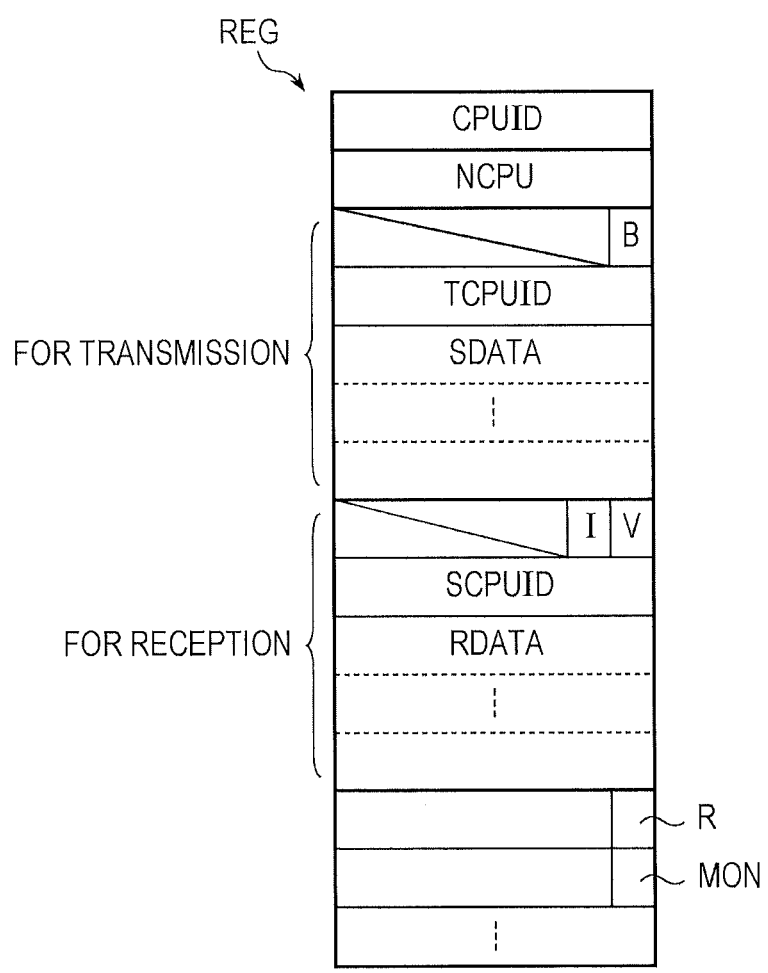
FIG. 9 illustrates an example of a register in a register interface (I/F) illustrated in FIG. 4.

The register I/F 240 includes, for example, a register REG for use in communication between the corresponding CPU and another CPU. The register REG has an area for storing information that represents transmission data output from the corresponding CPU and the CPU at the transmission destination, and information that represents reception data output from another CPU (CPU at the transmission source) and the other CPU. Furthermore, the register REG has a monitoring bit that is accessed by both the CPU and the CPU monitoring unit 260 and that is used to detect the failure of the CPU, and a reason bit representing the cause of startup of the CPU. An example of the register REG is illustrated in FIG. 9.

Figure 12:
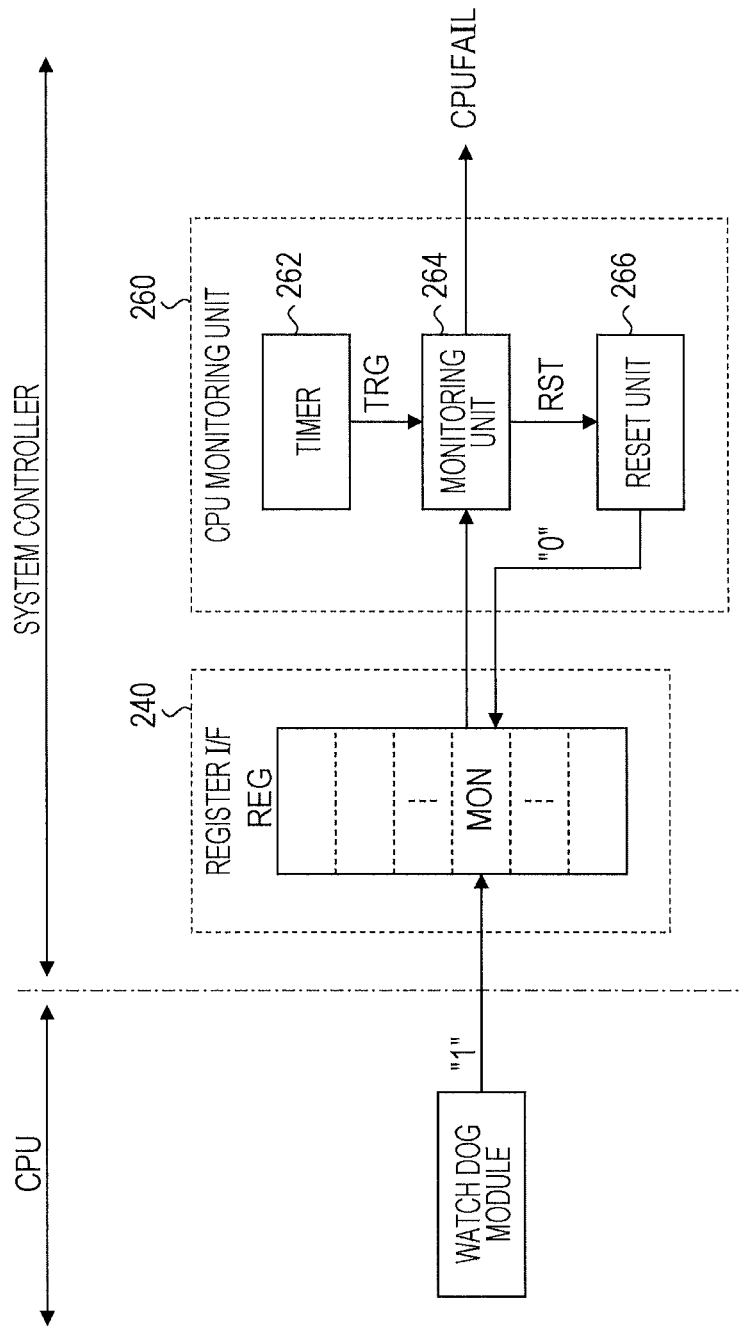
FIG. 12 illustrates an example of a CPU monitoring unit illustrated in FIG. 4.

When the CPU monitoring unit 260 detects the failure of the CPU based on a value of the monitoring bit in the register REG, it outputs failure information CPUFAIL indicating the failure of the CPU to the configuration control unit 400. The CPU monitoring unit 260 is disposed in one-to-one relation to the CPU and detects the failure of the corresponding CPU. Comparing with the case of detecting failures of plural CPUs by a common CPU monitoring unit, therefore, the failure of each CPU is more quickly detected and a time taken from the occurrence of the failure of the CPU to the replacement of the CPU is shortened. As a result, reduction of performance of the computer system caused by the replacement of the CPU is held smaller than the case of detecting failures of plural CPUs by a common CPU monitoring unit. The CPU monitoring unit 260 is one example of a first detection unit configured to detect the failure of some CPU in the computer system. An example of the CPU monitoring unit 260 is illustrated in FIG. 12.

The virtualization unit 280 has the function of converting the logical information indicating the CPU at the transmission destination, the logical information being received from the register REG, to the physical information in accordance with the system specifications set by the configuration control unit 400. For example, the virtualization unit 280 includes an address conversion table 286 that is set by the configuration control unit 400. The virtualization unit 280 has the function of outputting the converted physical information indicating the CPU at the transmission destination to the internal bus IBUS together with the transmission data stored in the register REG. The content of the address conversion table 286, the content of the map information table 408, and the content of the setting table 500 may be stored, for example, in a common memory device incorporated in the system controller 100.

When the corresponding CPU transmits data to the CPU at the transmission destination in the computer system, the virtualization unit 280 converts the logical information indicating the CPU at the transmission destination, which is instructed by the corresponding CPU, to the physical information in accordance with the information stored in the address conversion table 286. The logical information indicating the CPU at the transmission destination and the transmitted data are written in the register REG by the corresponding CPU. The virtualization unit 280 outputs the converted physical information indicating the CPU at the transmission destination and the physical information indicating the corresponding CPU to the internal bus IBUS.

When the corresponding CPU receives data from the CPU at the transmission source in the computer system, the virtualization unit 280 converts the physical information indicating the CPU at the transmission source, the physical information being received via the internal bus IBUS, to the logical information in accordance with the information stored in the address conversion table 286. The virtualization unit 280 then writes the converted logical information in the register REG together with the received data. The logical information indicating the CPU at the transmission source and the received data, both written in the register REG, are read out by the corresponding CPU.

Figure 10:
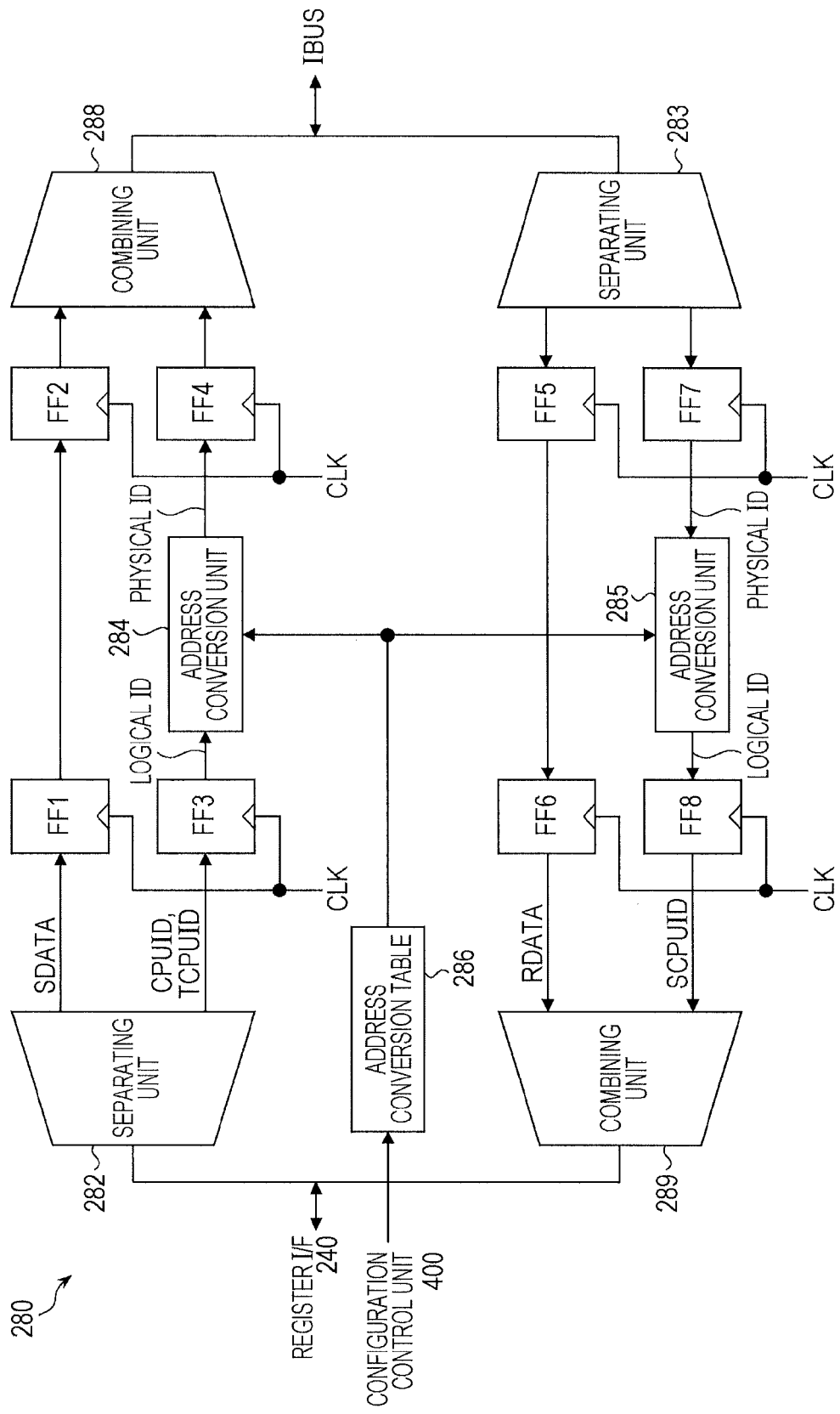
FIG. 10 illustrates an example of a virtualization unit illustrated in FIG. 4.

With the above-described operation of the virtualization unit 280, even when the failed CPU has been replaced with another CPU, the transmission data is sent to the proper CPU, and reception data is received by the proper CPU. The virtualization unit 280 is one example of the first control unit. An example of the virtualization unit 280 is illustrated in FIG. 10.

The memory control unit 300 includes a memory I/F 320, an error detection and correction unit 340, and a memory monitoring unit 360.

The memory I/F 320 outputs, for example, the address, the control signal, and the data to be written, which are supplied from the CPU via the crossbar switch 700, to the memory MEM in conformity with interface specifications of the memory MEM. Furthermore, the memory I/F 320 receives, for example, the read data output from the memory MEM and outputs the received read data to the memory I/F 220 of the CPU control unit 200 via the crossbar switch 700.

The error detection and correction unit 340 creates code for error detection and correction by employing the data to be written into the memory MEM. The created code is written into the memory MEM via the memory I/F 320 together with the written data. Furthermore, the error detection and correction unit 340 detects an error of the read data by employing the read data and the code, which are read out from the memory MEM via the memory I/F 320, thus correcting a correctable error. When the error detection and correction unit 340 corrects the error, it outputs error correction information to the memory monitoring unit 360. When the error detection and correction unit 340 detects an uncorrectable error, it outputs error detection information to the memory monitoring unit 360.

When the memory monitoring unit 360 receives the error correction information from the error detection and correction unit 340 at a predetermined number of times, the memory monitoring unit 360 outputs, to the configuration control unit 400, failure information MEMFAIL indicating that an error correctable failure has occurred in the memory MEM. The predetermined number of times, which represents the number of times the error correction information has been output, may be the number of times of error correction in a total storage area of the memory MEM, or the number of times of error correction for each predetermined storage area of the memory MEM. Moreover, when the memory monitoring unit 360 receives the error detection information from the error detection and correction unit 340, the memory monitoring unit 360 outputs, to the configuration control unit 400, failure information MEMFAIL indicating that a failure, for which an error is difficult to correct, has occurred in the memory MEM. The memory monitoring unit 360 is one example of a second detection unit configured to detect a failure of some memory unit MEM in the computer system.

The memory monitoring unit 360 is disposed in one-to-one relation to the memory MEM and detects the failure of the corresponding memory MEM. Comparing with the case of detecting failures of plural memories MEM by a common memory monitoring unit, therefore, the failure of each memory MEM is more quickly detected and a time taken from the occurrence of the failure of the memory MEM to the replacement of the memory MEM is shortened. As a result, reduction of performance of the computer system caused by the replacement of the memory MEM is held smaller than the case of detecting failures of plural memories MEM by a common memory monitoring unit.

FIG. 5 illustrates an example of the configuration control unit 400 illustrated in FIG. 4. The configuration control unit 400 includes a failure reception unit 402, a map control unit 404, a map determination unit 406, a map information table 408, rewrite units 410 and 412, and a power control unit 414. The failure reception unit 402 is realized, for example, with the interrupt function of a processor incorporated in the configuration control unit 400. The map control unit 404, the map determination unit 406, and the rewrite units 410 and 412 are realized, for example, with a control program executed by the processor. The power control unit 414 is one example of a fourth control unit, and it may be disposed outside the configuration control unit 400.

The rewrite unit 410 is realized, for example, with the processor incorporated in the configuration control unit 400, the processor accessing a memory storing the setting table 500 (FIG. 7) that is assigned in an address space of the system controller 100. The rewrite units 412 is realized, for example, with the processor incorporated in the configuration control unit 400, the processor accessing a memory storing the address conversion table 286 (FIG. 11) that is assigned in an address space of the system controller 100. The power control unit 414 is realized, for example, with the I/O function of a processor incorporated in the configuration control unit 400. The content of the map information table 408 is stored, for example, in a built-in memory of the processor incorporated in the configuration control unit 400.

The failure reception unit 402 receives the failure information CPUFAIL from the plural CPU monitoring units 260 and notifies the received failure information CPUFAIL to the map control unit 404 and the map determination unit 406. Furthermore, the failure reception unit 402 receives the failure information MEMFAIL from the plural memory monitoring units 360 and notifies the received failure information MEMFAIL to the map control unit 404 and the map determination unit 406.

Figure 6:
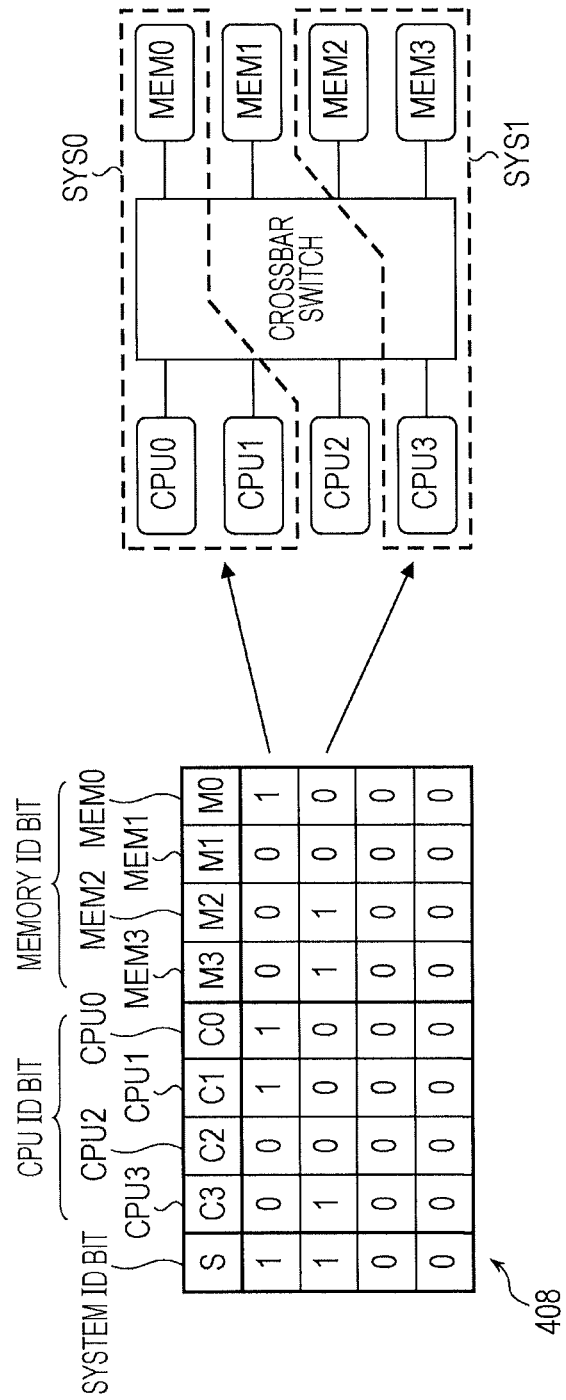
FIG. 6 illustrates an example of a map information table illustrated in FIG. 5.

Upon receiving the failure information CPUFAIL and MEMFAIL, the map control unit 404 outputs startup information ST to operate the map determination unit 406, and then waits for map information NEWMAP from the map determination unit 406. The map control unit 404 outputs update information UPD to the map information table 408 in accordance with the map information NEWMAP that has been determined by the map determination unit 406, thereby updating the map information table 408. An example of the map information table 408 is illustrated in FIG. 6.

After updating the map information table 408, the map control unit 404 outputs, to the rewrite unit 410, an instruction of rewriting the setting table 500 in conformity with the updated map information table 408. Furthermore, after updating the map information table 408, the map control unit 404 outputs, to the rewrite unit 412, an instruction of rewriting the address conversion table 286 in conformity with the updated map information table 408. In addition, after updating the map information table 408, the map control unit 404 outputs, to the power control unit 414, an instruction of controlling on/off of the electric power supplied to each CPU and an instruction of controlling on/off of the electric power supplied to each memory.

In accordance with the failure information CPUFAIL and MEMFAIL and the startup information ST, the map determination unit 406 reads the map information set in the map information table 408 and creates new map information NEWMAP. Stated in another way, the map determination unit 406 determines that the failed CPU is replaced with which one of the unused CPUs, or that the failed memory MEM is replaced with which one of the unused memories MEM. Then, the map determination unit 406 outputs the determined information, as the map information NEWMAP, to the map control unit 404.

In this embodiment, the map determination unit 406 has the function of determining the CPU that is used instead of the failed CPU, and the function of determining the memory MEM that is used instead of the failed memory MEM. The map control unit 404 has the function of controlling rewrite of the map information table 408, the setting table 500, and the address conversion table 286 in accordance with the determination result of the map determination unit 406. By designing the map determination unit 406 and the map control unit 404 to have the separate functions as described above, each circuit block is more easily designed in comparison with the case of designing the map determination unit 406 and the map control unit 404 as one unit having both the functions.

In response to an instruction from the map control unit 404, the rewrite unit 410 rewrites the setting table 500 in accordance with the map information in the map information table 408, which has been rewritten with the map information NEWMAP. In response to an instruction from the map control unit 404, the rewrite unit 412 rewrites the address conversion table 286 in accordance with the map information in the map information table 408, which has been rewritten with the map information NEWMAP.

The map control unit 404, the map determination unit 406, and the rewrite unit 410 change the content of the setting table 500 in response to detection of the occurrence of the failure of some CPU in the computer system under operation. Furthermore, the map control unit 404, the map determination unit 406, and the rewrite unit 410 have the function of replacing the failed CPU with another CPU by controlling the crossbar switch 700. The map control unit 404, the map determination unit 406, and the rewrite unit 410 are one example of the second control unit. Moreover, the map control unit 404 and the map determination unit 406 are one example of a selection unit configured to, upon the occurrence of the failure of some CPU, select another CPU, which is to be substituted for the failed CPU, from one or more unused CPUs, and to change the map information table 408 in accordance with a selection result.

The map control unit 404, the map determination unit 406, and the rewrite unit 412 are one example of a third control unit configured to invalidate the correlation information indicating the correspondence between a physical ID and a logical ID (FIG. 11) both indicating the failed CPU, and to set the correspondence between a physical ID indicating the other CPU and the invalidated logical ID.

In response to an instruction from the map control unit 404, the power control unit 414 outputs, to the CPU, the control information CPUPWR for controlling the electric power supplied to the CPU in accordance with the map information in the map information table 408, which has been rewritten with the map information NEWMAP. As a result, the electric power supplied to the failed CPU is turned off, and the electric power is supplied to the CPU that is operated instead of the failed CPU.

Furthermore, in response to an instruction from the map control unit 404, the power control unit 414 outputs, to the memory MEM, the control information MEMPWR for controlling the electric power supplied to the memory MEM in accordance with the map information in the map information table 408, which has been rewritten with the map information NEWMAP. As a result, the electric power supplied to the failed memory MEM is turned off, and the electric power is supplied to the memory MEM that is operated instead of the failed memory MEM.

The control information CPUPWR is, for example, a control signal for controlling the operation of a switch disposed between an external power line and a power line of the CPU. The switch connects the external power line to the power line of the CPU when receiving the control information CPUPWR indicating power-on, and cuts off the connection between the external power line and the power line of the CPU when receiving the control information CPUPWR indicating power-off.

Similarly, the control information MEMPWR is, for example, a control signal for controlling the operation of a switch disposed between the external power line and a power line of the memory MEM. The switch connects the external power line to the power line of the memory MEM when receiving the control information MEMPWR indicating power-on, and cuts off the connection between the external power line and the power line of the memory MEM when receiving the control information MEMPWR indicating power-off.

Since the power control unit 414 turns off the electric power supplied to the unused or failed CPU and also turns off the electric power supplied to the unused or failed memory MEM, power consumption of the information processing apparatus 1100 is reduced in comparison with that in the case of not turning off the power supply.

FIG. 6 illustrates an example of the map information table 408 illustrated in FIG. 5. The map information table 408 contains system identification (ID) bits S, CPU ID bits C (for example, C3, C2, C1 and C0), and memory ID bits M (for example, M3, M2, M1 and M0) depending on the number of CPUs included in the information processing apparatus 1100. For the sake of simplifying the description, FIG. 6 illustrates an example in which the information processing apparatus 1100 includes four CPU3 to CPU0 and four memories MEM3 to MEM0. Accordingly, the map information table 408 contains four ID bits S corresponding to the number of CPUs, four CPU ID bits C3 to C0 set in one-to-one relation to the ID bits S, and four memory ID bits M3 to M0 set in one-to-one relation to the ID bits S. The number of CPUs and the number of memory MEMs included in the information processing apparatus 1100 may be different from each other.

"1" of the system ID bit S indicates that one computer system is constructed, and "0" of the system ID bit S indicates that the computer system is not constructed.

The CPU ID bits C3 to C0 are set respectively corresponding to the CPU3 to the CPU0 for each system ID bit S. In a row corresponding to the system ID bit S set to "1", the CPU ID bits C set to "1" indicates that the corresponding CPU is included in the constructed computer system. The memory ID bits M3 to M0 are set *ers corresponding to the memory MEM3 to the memory MEM0 for each system ID bit S. In the row corresponding to the system ID bit S set to "1", the memory ID bit M set to "1" indicates that the corresponding memory MEM is included in the constructed computer system.

For example, a first row of the map information table 408 illustrated in FIG. 6 indicates that one computer system is constructed by the CPU1 and the CPU0 corresponding to the CPU ID bits C1 and C0, respectively, and by the memory MEM0 corresponding to the memory ID bit M0. Similarly, a second row of the map information table 408 indicates that another computer system is constructed by the CPU3 corresponding to the CPU ID bit C3, and by the memories MEM3 and MEM2 corresponding to the memory ID bits M3 and M2, respectively.

In the right side of FIG. 6, two computer systems constructed in accordance with the map information table 408 are denoted by broken lines. Here, the first row of the map information table 408 indicates a computer system SYS0 having a virtual system identification (ID) of 0, and the second row of the map information table 408 indicates a computer system SYS1 having the virtual system ID of 1.

Figure 7:
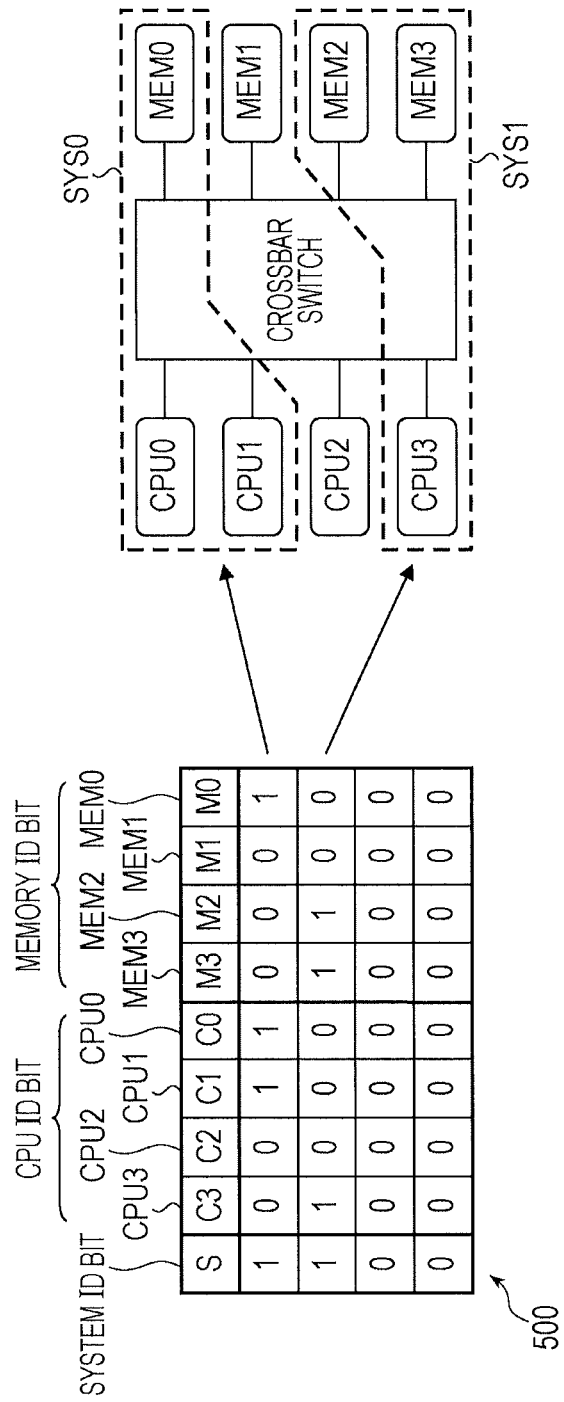
FIG. 7 illustrates an example of a setting table illustrated in FIG. 4.

FIG. 7 illustrates an example of the setting table 500 illustrated in FIG. 4. For example, the setting table 500 has a similar configuration to that of the map information table 408 illustrated in FIG. 6, and contains the system ID bits S, the CPU ID bits C, and the memory ID bits M. Furthermore, the content of the setting table 500 is the same as that of the map information table 408 because the content of the setting table 500 is also rewritten by the map control unit 404 in accordance with the map information NEWMAP that has been determined by the map determination unit 406 illustrated in FIG. 5. FIG. 7 illustrates an example in which the information processing apparatus 1100 includes four CPU3 to CPU0 and four memories MEM3 to MEM0, as in FIG. 6.

FIG. 8 illustrates an example of the crossbar switch 700 illustrated in FIG. 3. The example illustrated in FIG. 8 represents the case where the setting table 500 is set in the state illustrated in FIG. 7. A thick solid line represents a multi-signal line (for example, an address bus AD, a data bus I/O, or a control signal CNT), and a thin solid line represents a single-signal line (for example, a chip select signal CS). For example, the control signal CNT includes a write enable signal and an output enable signal in the case of the SRAM or the flash memory, and includes a row address strobe signal, a column address strobe signal, and a write enable signal in the case of the DRAM.

Circles denoted around the crossbar switch 700 represent input/output terminals of the crossbar switch 700. Signal lines denoted inside the crossbar switch 700 represent the connection relation between the terminals of the crossbar switch 700, which is set in accordance with the setting table 500. In the illustrated example, one memory MEM0 is shared by two CPU0 and CPU1 in the computer system SYS0 having the virtual system ID of 0. Two memories MEM2 and MEM3 are accessed by one CPU3 in the computer system SYS1 having the virtual system ID of 1.

When accessing the memory MEM0, each of the CPU0 and the CPU1 drives the address signal line AD, the data signal line I/O, the control signal CNT, and the chip select signal CS0. In the example illustrated in FIGS. 6 and 7, the CPU0 to the CPU3 are each accessible to four memories MEM0 to MEM3 at maximum. Therefore, a CPU having four chip select terminals CS0, CS1, CS2 and CS3 is used as each of the CPU0 to the CPU3. It is to be noted that, although the chip select terminals CS0, CS1, CS2 and CS3 are included in the control signal CNT, they are illustrated separately from the control signal CNT for easier understanding of the description.

In the computer system SYS0, write data is transferred to the data signal line I/O in write operation of writing the data into the memory MEM0 from the CPU0 or the CPU1. When not accessing the memory MEM0, each of the CPU0 and the CPU1 sets the address signal line AD, the data signal line I/O, and the control signal CNT to a floating state. As a result, signals output from the CPU0 and the CPU1 to the memory MEM0 are avoided from colliding with each other.

In the computer system SYS1, when accessing the memory MEM2, the CPU3 outputs, to the crossbar switch 700, not only the address signal AD, the data signal I/O, and the control signal CNT, but also the chip select signal CS0. When accessing the memory MEM3, the CPU3 outputs, to the crossbar switch 700, not only the address signal AD, the data signal I/O, and the control signal CNT, but also the chip select signal CS1. Via the crossbar switch 700, the chip select signal CS0 is supplied to the chip select terminal CS of the memory MEM2, and the chip select signal CS1 is supplied to the chip select terminal CS of the memory MEM3.

FIG. 9 illustrates an example of the register REG in the register I/F 240 illustrated in FIG. 4. The register REG is disposed corresponding to each CPU. The register REG has areas for storing CPU information CPUID, CPU number information NCPU, CPU information TCPUID for transmission, transmission data SDATA, CPU information SCPUID for reception, and reception data RDATA. In addition, the register REG includes flags B, I and V, a reason bit R, and a monitoring bit MON.

The CPU information CPUID represents a logical ID assigned to indicate the corresponding CPU in the computer system to which the relevant CPU belongs. For example, the CPU having the CPU information CPUID set to "0" is a system CPU that manages the entire computer system. The logical ID will be described later with reference to FIG. 11.

The CPU number information NCPU represents the number of CPUs included in the computer system to which the corresponding CPU belongs. For example, the computer system SYS0 having the virtual system ID of 0, illustrated in FIG. 6, includes two CPU0 and CPU1. In such a case, "2" is stored in each of the area for the CPU number information NCPU in the register REG corresponding to the CPU0 and the area for the CPU number information NCPU in the register REG corresponding to the CPU1. Similarly, the computer system SYS1 having the virtual system ID of 1, illustrated in FIG. 6, includes one CPU3. In such a case, "1" is stored in the area for the CPU number information NCPU in the register REG corresponding to the CPU3.

For example, when the computer system operates as a multi-processor system including a plurality of CPUs, the CPU number information NCPU is used for an operating system (OS) to separately distribute tasks to the CPUs. The OS manages the entire multi-processor system and reads out the CPU number information NCPU set in the register REG by the configuration control unit 400, when the computer system is started up.

The CPU information TCPUID represents a logical ID of the CPU at the transmission destination. For example, the same value as that stored as the CPU information CPUID of the CPU at the transmission destination is stored in the area for the CPU information TCPUID. Data transmitted to the CPU indicated by the CPU information TCPUID is stored in the area for the transmission data SDATA.

The flag B indicates whether the function of transmitting data by the register I/F 240 is in a busy state or a ready state. The register I/F 240 sets the flag B to the busy state when the corresponding CPU writes the CPU information TCPUID and the transmission data SDATA into the register REG. After the transmission data SDATA has been transmitted to the CPU indicated by the CPU information TCPUID, the register I/F 240 resets the flag B to the ready state.

The busy state of the flag B indicates a state during the transmission of the transmission data SDATA by the register I/F 240 or a state waiting for the transmission. While the flag B is set in the busy state, write of the new CPU information TCPUID and transmission data SDATA into the register REG by the corresponding CPU is inhibited. As a result, the data written into the register REG is transmitted to the CPU designated by the CPU information TCPUID without being overwritten, and the computer system is avoided from malfunctioning.

The CPU information SCPUID represents a logical ID of the CPU at the transmission source from which the reception data RDATA has been transmitted. For example, when data is transmitted from the CPU1 to the CPU2 via the internal bus IBUS, the register I/F 240 corresponding to the CPU1 stores "1" into the area for the CPU information SCPUID in the register REG corresponding to the CPU2.

The data received from the CPU at the transmission source indicated by the CPU information SCPUID is stored in the region for the reception data RDATA. For example, when data is transmitted from the CPU1 to the CPU2, the transmission data SDATA stored in the register REG corresponding to the CPU1 at the transmission source is stored, via the internal bus IBUS, into the area for the reception data RDATA in the register REG corresponding to the CPU2 at the transmission destination.

The flag V is set to "1" when effective reception data RDATA is present in the register REG, and to "0" when effective reception data RDATA is not present in the register REG. For example, when the CPU information RCPUID and the reception data RDATA are transferred to the register REG from another CPU at the transmission source, the register I/F 240 sets the flag V. The corresponding CPU at the transmission destination periodically monitors the flag V and reads the CPU information RCPUID and the reception data RDATA from the register REG when the flag V is set. After the CPU information RCPUID and the reception data RDATA have been read by the CPU, the register I/F 240 resets the flag V.

The flag I is used for the corresponding CPU to recognize, using the interrupt function, that the reception data RDATA has been transferred to the register REG from another CPU. When the flag I is set to "1" by the corresponding CPU, the register I/F 240 generates an interrupt request to the corresponding CPU upon the setting of the flag I. In response to the interrupt request, the corresponding CPU recognizes the reception of data and reads out the CPU information RCPUID and the reception data RDATA from the register REG. After reading out the CPU information RCPUID and the reception data RDATA from the register REG, the corresponding CPU resets the flag I.

The reason bit R indicates the reason why the corresponding CPU has been started up. "0" of the reason bit R indicates that the CPU has been started up in accordance with the ordinary power-on sequence.

For example, the configuration control unit 400, illustrated in FIG. 4, resets the reason bit R of the register REG corresponding to each CPU to "0" in the initialization sequence at the power-on of the information processing apparatus 1100. Furthermore, when the failed CPU is replaced with the unused CPU and the use of the unused CPU is started, the configuration control unit 400 sets the reason bit R of the register REG, which corresponds to the newly used CPU, to "1". By referring to the reason bit R after the power-on, each CPU may determine whether the CPU has been started up in the ordinary power-on sequence or with the replacement of the failed CPU.

The monitoring bit MON is set by the corresponding CPU at a predetermined period T0 (FIG. 13), and is reset by the CPU monitoring unit 260 at a predetermined period T1 (FIG. 13) that is longer than the period T0. When a value of the monitoring bit MON read before resetting represents a reset state, the CPU monitoring unit 260 detects that the monitoring bit MON has not been set by the corresponding CPU, thus detecting a failure of the corresponding CPU. The monitoring bit MON will be described below with reference to FIGS. 12 and 13.

FIG. 10 illustrates an example of the virtualization unit 280 illustrated in FIG. 4. The virtualization unit 280 includes separating units 282 and 283, address conversion units 284 and 285, an address conversion table 286, combining units 288 and 289, and a plurality of flip-flops FF (FF1 to FF8). The flip-flops FF1, FF2, FF3, FF4, FF5, FF6, FF7 and FF8 operate, for example, in synchronism with a common clock signal CLK. The flip-flops FF1 to FF8 are each one example of a latch.

The separating unit 282, the address conversion unit 284, the combining unit 288, and the flip-flops FF1 to FF4 are operated when the corresponding CPU transmits data to another CPU. The separating unit 283, the address conversion unit 285, the combining unit 289, and the flip-flops FF5 to FF8 are operated when the corresponding CPU receives data from another CPU.

The separating unit 282 separates, for example, the CPU information CPUID (logical ID) indicating the CPU at the transmission source and the CPU information TCPUID (logical ID) indicating the CPU at the transmission destination from the transmission data SDATA, which are all sent in a packet from the register I/F 240 illustrated in FIG. 4. The separating unit 282 outputs the separated CPU information CPUID and TCPUID to the flip-flop FF3, and outputs the separated transmission data SDATA to the flip-flop FF1.

The address conversion unit 284 converts the logical IDs indicated by the CPU information CPUID and TCPUID, which are received from the flip-flop FF3, to physical IDs, respectively, by referring to the address conversion table 286. The address conversion unit 284 outputs the converted physical IDs to the flip-flop FF4. The flip-flops FF1 and FF2 successively latch the transmission data SDATA output from the separating unit 282, and the final flip-flop FF2 outputs the latched transmission data SDATA to the combining unit 288.

The combining unit 288 combines the transmission data SDATA and the converted physical IDs, which are received respectively from the flip-flops FF2 and FF4, to create a packet, for example, and outputs the created packet to the internal bus IBUS.

On the other hand, the separating unit 283 separates, for example, the CPU information SCPUID (physical ID) indicating the CPU at the transmission source from the reception data RDATA, which are both sent in a packet via the internal bus IBUS. The separating unit 283 outputs the separated CPU information SCPUID to the flip-flop FF7, and outputs the separated reception data RDATA to the flip-flop FF5.

The address conversion unit 285 converts the physical ID indicated by the CPU information SCPUID, which is received from the flip-flop FF7, to a logical ID by referring to the address conversion table 286. The address conversion unit 284 outputs the converted logical ID to the flip-flop FF8. The flip-flops FF5 and FF6 successively latch the reception data RDATA output from the separating unit 283, and the final flip-flop FF6 outputs the latched reception data RDATA to the combining unit 289.

The combining unit 289 combines the reception data RDATA and the converted logical ID, which are received respectively from the flip-flops FF6 and FF8, to create a packet, for example, and outputs the created packet to the corresponding register I/F 240.

For example, the address conversion unit 284 converts the logical ID to the physical ID by referring to the address conversion table 286 within one cycle of the clock signal received by the flip-flops FF1 to FF4. Therefore, the flip-flops FF2 and FF4 latch respectively the transmission data SDATA from the flip-flop FF1 and the physical ID from the address conversion unit 284 in a common clock cycle, and output them to the combining unit 288. Similarly, the address conversion unit 285 converts the physical ID to the logical ID by referring to the address conversion table 286 within one cycle of the clock signal received by the flip-flops FF5 to FF8. Therefore, the flip-flops FF6 and FF8 latch respectively the reception data RDATA from the flip-flop FF5 and the logical ID from the address conversion unit 285 in a common clock cycle, and output them to the combining unit 289.

In other words, even when the conversion operation executed by the address conversion unit 284 takes a predetermined time, the converted physical ID is transferred to the CPU at the transmission destination without being delayed relative to the transmission data SDATA. Similarly, even when the conversion operation executed by the address conversion unit 285 takes a predetermined time, the converted logical ID is transferred to the register I/F 240 without being delayed relative to the reception data RDATA.

The address conversion unit 284 just processes the CPU information TCPUID, which has been separated by the separating unit 282, without extracting the CPU information TCPUID from among the information including the transmission data SDATA. Accordingly, it is easier to complete the conversion operation executed by the address conversion unit 284 in one clock cycle than the case where the address conversion unit 284 executes both the operation of extracting the CPU information TCPUID and the conversion operation to the physical ID. Similarly, the address conversion unit 285 just processes the CPU information SCPUID, which has been separated by the separating unit 283, without extracting the CPU information SCPUID from among the information including the reception data RDATA. Accordingly, it is easier to complete the conversion operation executed by the address conversion unit 285 in one clock cycle than the case where the address conversion unit 285 executes both the operation of extracting the CPU information SCPUID and the conversion operation to the logical ID. An example of the address conversion table 286 is illustrated in FIG. 11.

The address conversion unit 284 operating when transmitting data may convert just the logical ID, which is represented by the CPU information TCPUID indicating the CPU at the transmission destination, to the physical ID without converting the logical ID, which is represented by the CPU information CPUID indicating the CPU at the transmission source, to the physical ID. In such a case, the CPU receiving the data receives the CPU information CPUID indicating the CPU at the transmission source, as the logical data, instead of the physical data. Therefore, the separating unit 283, the address conversion unit 285, the combining unit 289, and the flip-flops FF5 to FF8 may be omitted from the virtualization unit 280. Thus, a simpler circuit than in FIG. 10 is obtained.

When the time taken for the conversion executed by the address conversion unit 284 is longer than one clock cycle and shorter than two clock cycles, the number of flip-flops FF connected in series for latching the transmission data SDATA may be set to three. Similarly, when the time taken for the conversion executed by the address conversion unit 285 is longer than one clock cycle and shorter than two clock cycles, the number of flip-flops FF connected in series for latching the reception data RDATA may be set to three.

Figure 11:
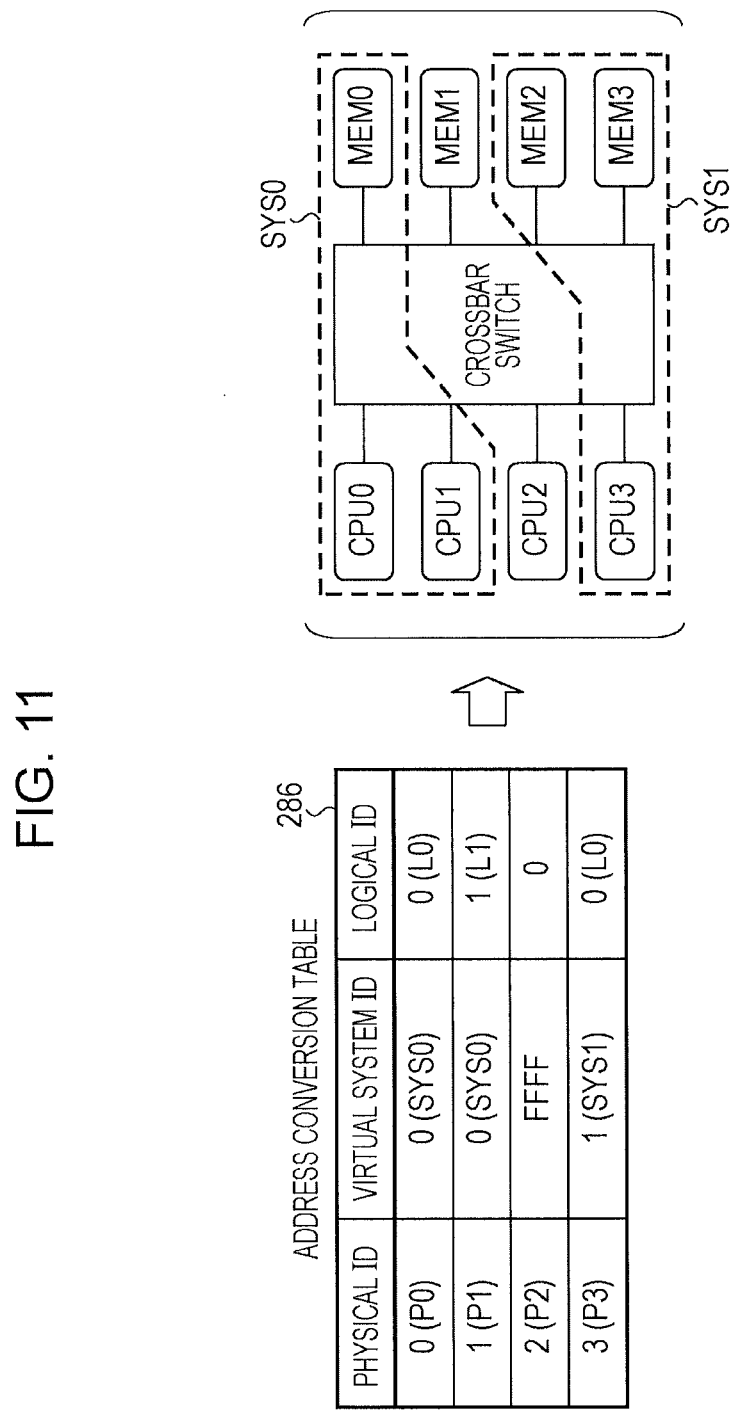
FIG. 11 illustrates an example of an address conversion table illustrated in FIG. 10.

FIG. 11 illustrates an example of the address conversion table 286 illustrated in FIG. 10. In the example illustrated in FIG. 11, for the sake of simplifying the description, it is assumed that the information processing apparatus 1100 includes four CPUs. The address conversion table 286 has areas for storing a physical ID of the CPU, a virtual system ID, and a logical ID (virtual ID) of the CPU.

The physical ID represents a specific number for identifying the CPU included in the information processing apparatus 1100, and it is one example of physical information. The virtual system ID represents a number assigned to the computer system SYS constructed in the information processing apparatus 1100. The logical ID represents a number virtually assigned to identify the CPU in the computer system SYS, and it is one example of logical information. The address conversion table 286 is one example of a storage unit configured to store correlation information indicating the correspondence between the physical ID and the logical ID of the CPU.

In the following description, the physical ID of 0, the physical ID of 1, the physical ID of 2, and the physical ID of 3 are denoted respectively by symbols P0, P1, P2, and P3 in some cases. Similarly, the logical ID of 0 and the logical ID of 1 are denoted respectively by symbols L0 and L1 in some cases.

In the example illustrated in FIG. 11, the information processing apparatus 1100 includes two computer systems SYS0 and SYS1 having the virtual system IDs of 0 and 1, respectively. The computer system SYS0 having the virtual system ID of 0 includes CPUs having the physical IDs of 0 and 1. The CPUs having the physical IDs of 0 and 1 are assigned respectively with the logical IDs of 0 and 1 in the computer system SYS0 having the virtual system ID of 0. The computer system SYS1 having the virtual system ID of 1 includes a CPU having the physical ID of 3. The CPU having the physical ID of 3 is assigned with the logical ID of 0 in the computer system SYS1 having the virtual system ID of 1.

For an unused CPU (CPU having the physical ID of 2 in the illustrated example), "FFFF" in hexadecimal notation is set in the area of the virtual system ID. In the right side of FIG. 11, the two computer systems SYS0 and SYS1 constructed in accordance with the address conversion table 286 are denoted by broken lines. The memories MEM0, MEM2, and MEM3 included in the two computer systems SYS0 and SYS1 are assigned in accordance with the map information table 408 illustrated in FIG. 6 and the setting table 500 illustrated in FIG. 7.

In this embodiment, since the area for the virtual system ID for identifying each of plural computer systems is prepared in the address conversion table 286, the plural computer systems may be constructed in the information processing apparatus 1100.

Figure 13:
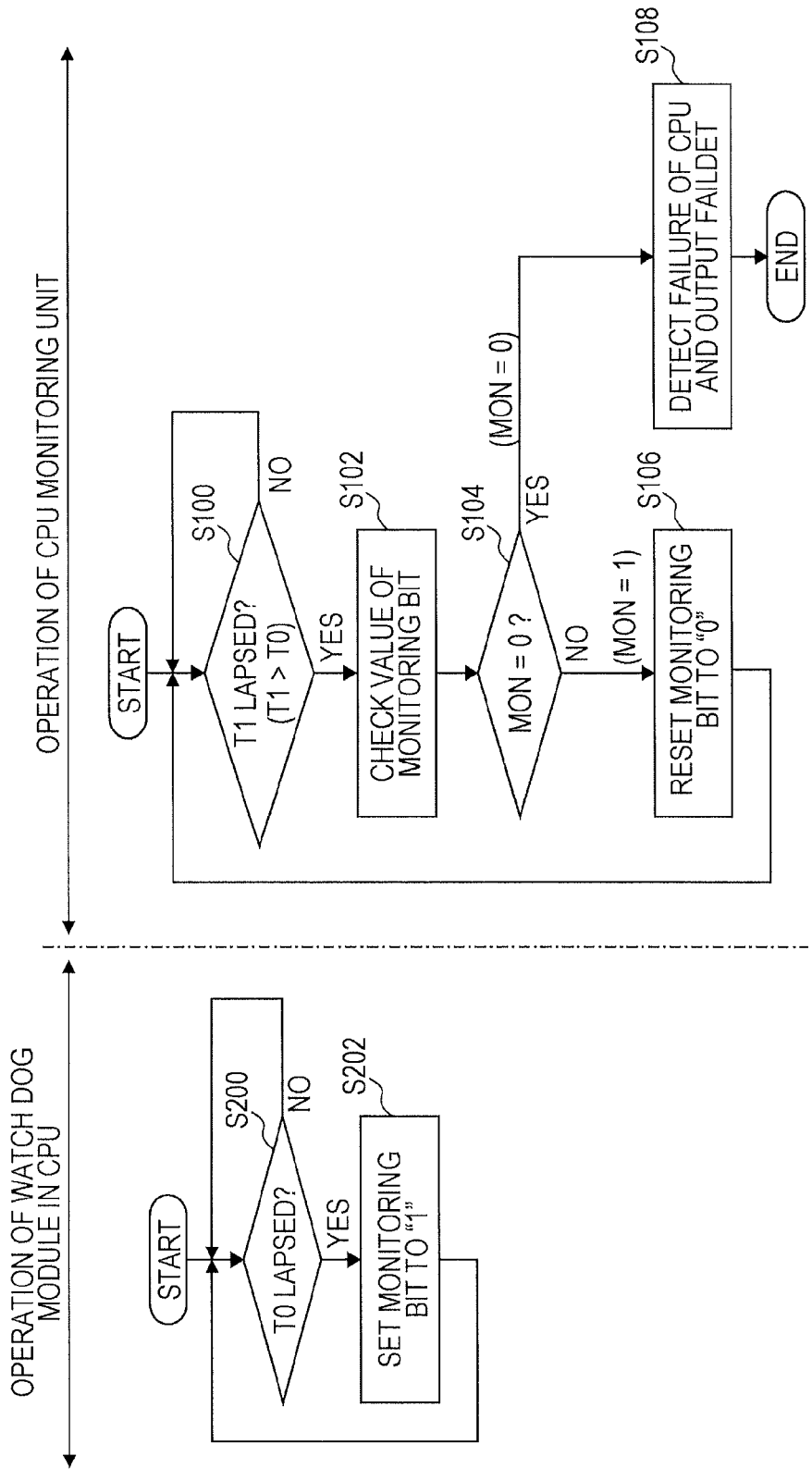
FIG. 13 illustrates an example of operation of the CPU monitoring unit illustrated in FIG. 12.

FIG. 12 illustrates an example of the CPU monitoring unit 260 illustrated in FIG. 4. The CPU monitoring unit 260 includes a timer 262, a monitoring unit 264, and a reset unit 266. The timer 262 outputs trigger information TRG, such as a trigger signal, at a predetermined period T1 (FIG. 13). The monitoring unit 264 reads a value of the monitoring bit MON in the register REG of the register I/F 240 in response to the trigger information TRG. The monitoring unit 264 outputs reset information RST, such as a reset signal, when the value of the monitoring bit MON is "1", and outputs failure information CPUFAIL to the configuration control unit 400, illustrated in FIG. 4, when the value of the monitoring bit MON is "0". The reset unit 266 resets the monitoring bit MON to "0" in response to the reset information RST.

The monitoring bit MON is set to "1" by a watch dog module, disposed in the corresponding CPU, at a predetermined period T0 (FIG. 13) that is shorter than the period T1. Accordingly, when the corresponding CPU operates in a normal state, the monitoring bit MON is periodically set to "1", and the monitoring unit 264 does not detect the monitoring bit MON being "0". On the other hand, when the operation of the watch dog module is stopped due to a failure of the corresponding CPU, the monitoring bit MON having been reset by the reset unit 266 is not set by the corresponding CPU. As a result, the monitoring unit 264 detects the monitoring bit MON being 0, thereby detecting the failure of the corresponding CPU. The watch dog module may be realized, for example, with hardware of the CPU or software.

FIG. 13 illustrates an example of the operation of the CPU monitoring unit 260 illustrated in FIG. 12. The operation illustrated in FIG. 13 is executed in each CPU operating as the computer system. First, in step S200, the watch dog module in the corresponding CPU determines whether the period T0 has lapsed. If the period T0 has lapsed, the watch dog module sets the monitoring bit MON to "1" in step S202. Thereafter, the watch dog module repeats step S200 again and waits for the lapse of the period T0.

In step S100, the CPU monitoring unit 260 determines whether the period T1 longer than the period T0 has lapsed. If the period T1 has lapsed, the CPU monitoring unit 260 checks the value of the monitoring bit MON in step S102. Next, in step S104, the CPU monitoring unit 260 determines whether the monitoring bit MON is reset to "0". If the monitoring bit MON is "1", the CPU monitoring unit 260 resets the monitoring bit MON to "0" in step S106. Thereafter, the CPU monitoring unit 260 repeats step S100 again and waits for the lapse of the period T1.

On the other hand, if the monitoring bit MON is "0", the CPU monitoring unit 260 detects the failure of the CPU and outputs the failure information CPUFAIL to the configuration control unit 400, illustrated in FIG. 4, in step S108.

When the watch dog module is realized with software, the CPU starts up an interrupt handler for each period T0 by employing a timer. The interrupt handler sets the monitoring bit MON to "1" and ends its operation. With the end of the operation of the interrupt handler, execution of a main program before the startup of the interrupt handler is restored. An interrupt request to start up the interrupt handler is preferably provided, for example, as a non-maskable interrupt (NMI), which has higher priority than other interrupt requests and which is not masked by the OS. As a result, the startup of the interrupt handler is avoided from being impeded by, for example, the processing of the OS, and the failure of the CPU is detected even during the operation of the OS and so on.

Figure 14:
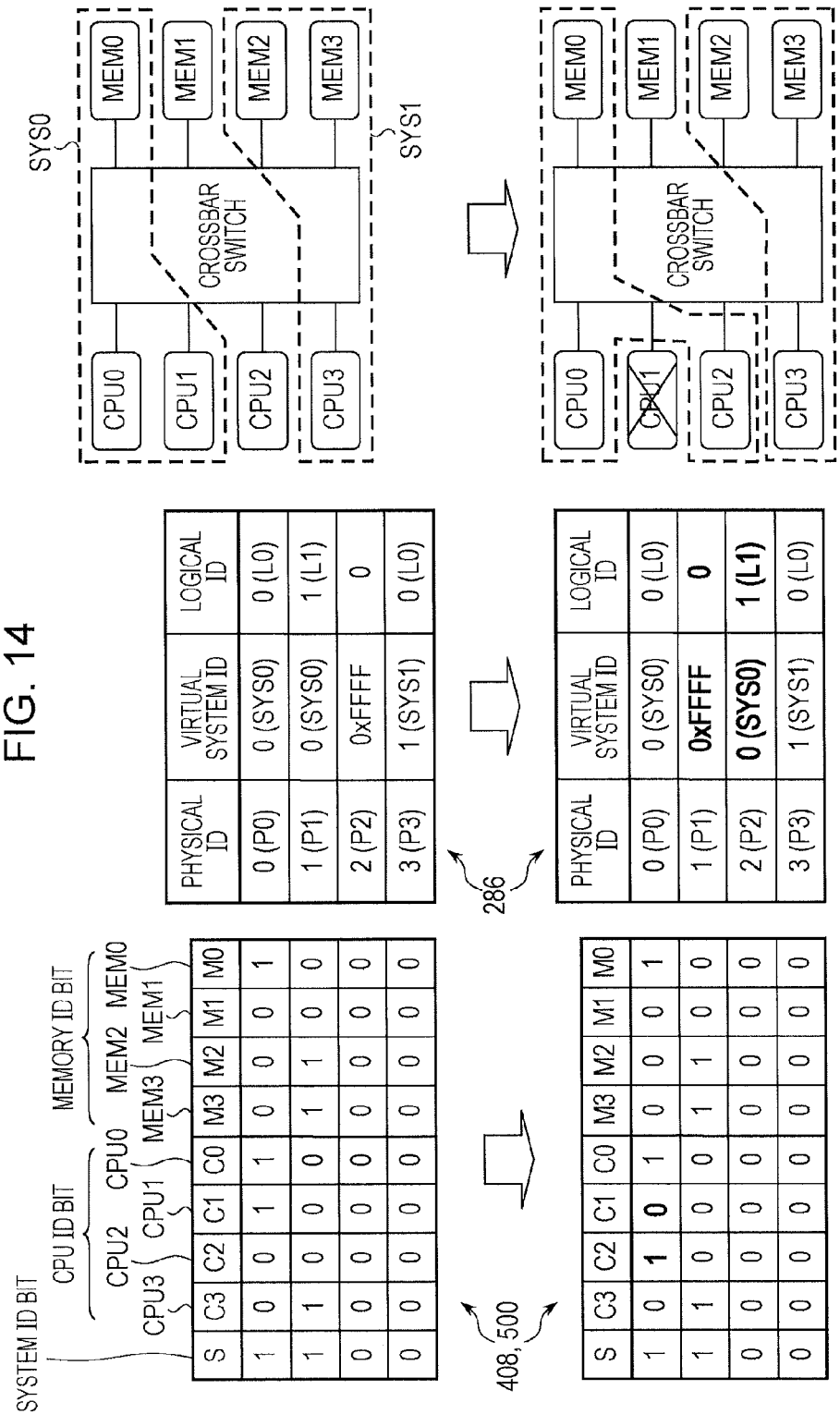
FIG. 14 illustrates an example in which a failed CPU is replaced with an unused CPU in the information processing apparatus illustrated in FIG. 3.

FIG. 14 illustrates an example in which a failed CPU is replaced with an unused CPU in the information processing apparatus illustrated in FIG. 3. A state illustrated in the upper side of FIG. 14 is the same as that as illustrated in FIGS. 6, 7, and 11. During the operation of the information processing apparatus 1100 in the state illustrated in the upper side of FIG. 14, for example, the CPU monitoring unit 260 (FIG. 12) corresponding to the CPU1 detects a failure of the CPU1 and outputs, to the configuration control unit 400, the failure information CPUFAIL indicating the failure of the CPU1.

In accordance with the failure information CPUFAIL, the configuration control unit 400 (FIG. 5) rewrites the map information table 408 in FIG. 6 as illustrated in the lower side of FIG. 14. Furthermore, in accordance with the rewritten map information table 408, the configuration control unit 400 rewrites the setting table 500 (FIG. 7) and the address conversion table 286 (FIG. 11) as illustrated in the lower side of FIG. 14. In the lower side of FIG. 14, rewritten values are denoted by bold fonts. As a result, in the computer system SYS0 having the virtual system ID set to 0, the failed CPU1 is automatically replaced with the free CPU2 without resorting to manual operation.

Figure 15:
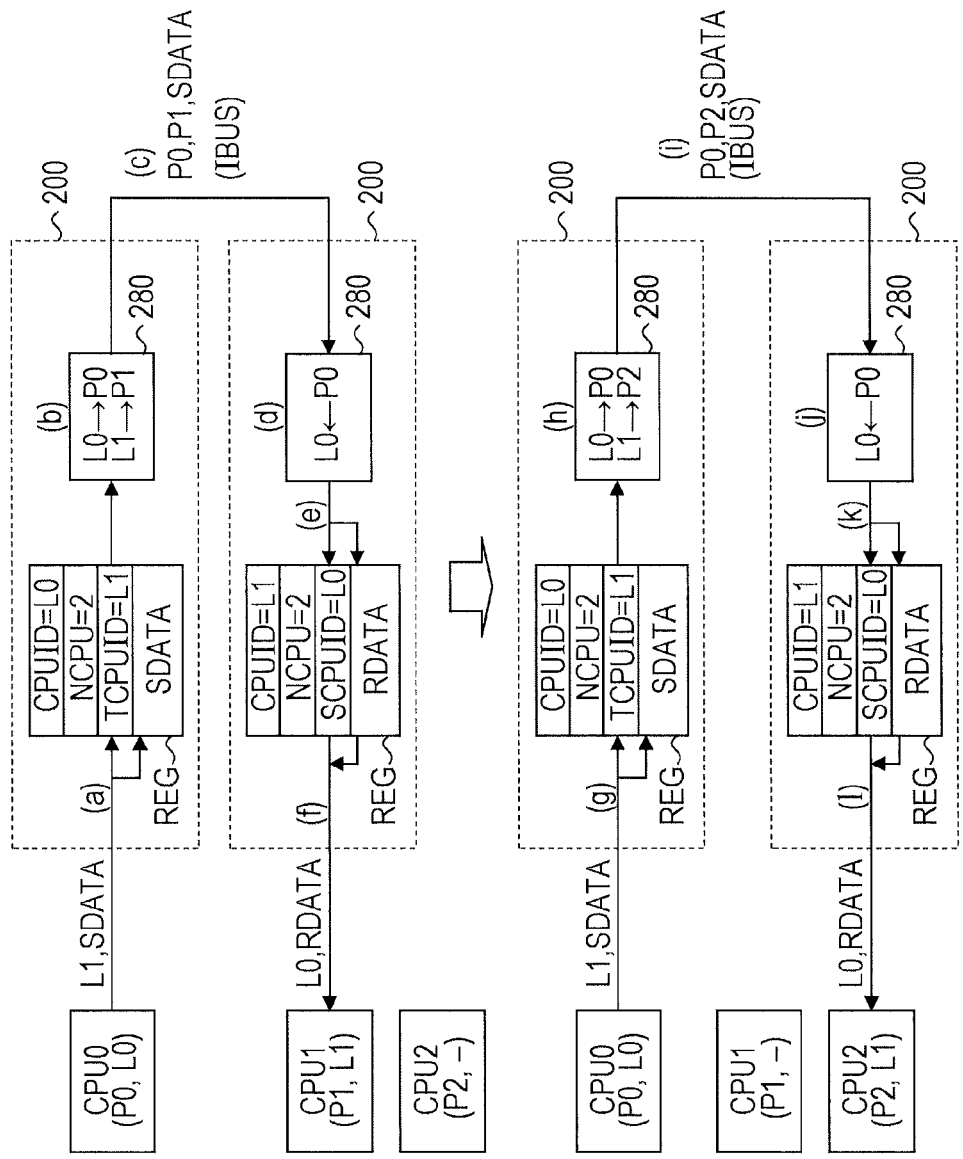
FIG. 15 illustrates an example of operations of the CPU control unit before and after the replacement of the failed CPU with the unused CPU in the information processing apparatus illustrated in FIG. 3.

FIG. 15 illustrates an example of operations of the CPU control unit 200 before and after the replacement of the failed CPU with the unused CPU in the information processing apparatus illustrated in FIG. 3. A state illustrated in the upper side of FIG. 15 represents the operation in the state illustrated in the upper side of FIG. 14, and a state illustrated in the lower side of FIG. 15 represents the operation in the state illustrated in the lower side of FIG. 14. Thus, in this example, it is assumed as in FIG. 14 that, in the computer system SYS0 having the virtual system ID set to 0, the failed CPU1 is replaced with the unused CPU2.

In the computer system SYS0 having the virtual system ID set to 0, prior to the failure of the CPU1, the CPU0 is assigned to the logical ID of 0 (L0), and the CPU1 is assigned to the logical ID of 1 (L1). For example, in the upper side of FIG. 15, the CPU0 stores the logical ID (=L1) and the transmission data SDATA in the respective areas for the CPU information TCPUID for transmission and the transmission data SDATA within the register REG corresponding to the CPU0 (denoted by (a) in FIG. 15). At that time, the CPU0 recognizes the CPU (that is, CPU1) at the transmission destination based on the logical ID instead of the physical ID (that is, P1).

The virtualization unit 280 corresponding to the CPU0 refers to the address conversion table 286 illustrated in FIG. 11, and converts the logical ID (=L0), which is contained in the CPU information CPUID indicating the transmission source, to the physical ID (=P0). In addition, the virtualization unit 280 corresponding to the CPU0 converts the logical ID (=L1), which is contained in the CPU information TCPUID indicating the transmission destination, to the physical ID (=P1) (as denoted by (b) in FIG. 15). The virtualization unit 280 corresponding to the CPU0 outputs the physical ID (=P0) indicating the CPU at the transmission source and the physical ID (=P1) indicating the CPU at the transmission destination to the internal bus IBUS together with the transmission data SDATA (as denoted by (c) in FIG. 15).

The virtualization unit 280 corresponding to the CPU1 (physical ID=P1) receives the physical ID (=P0) indicating the transmission source and the transmission data SDATA, which are transferred via the internal bus IBUS together with the physical ID (=P1) indicating the transmission destination. The virtualization unit 280 corresponding to the CPU1 converts the received physical ID (=P0) indicating the transmission source to the logical ID (=L0) in accordance with the address conversion table 286 (as denoted by (d) in FIG. 15). The virtualization unit 280 corresponding to the CPU1 stores the converted logical ID (=L0) and the received transmission data SDATA in the respective areas for the CPU information SCPUID for reception and the reception data RDATA within the register REG corresponding to the CPU1 (as denoted by (e) in FIG. 15). The CPU1 assigned with the logical ID (=L1) recognizes that the data has been transmitted via the register REG from the CPU0 assigned with the logical ID (=L0), and reads out the reception data RDATA from the register REG (as denoted by (f) in FIG. 15). As a result, in the computer system SYS0 having the virtual system ID set to 0, transfer of the data from the CPU0 assigned with the logical data (=L0) to the CPU1 assigned with the logical ID (=L1) is completed.

On the other hand, when the failed CPU1 is replaced with the CPU2, the configuration control unit 400 (FIG. 5) sets the information (including, for example, the CPU information CPUID and the CPU number information NCPU), which is set in the register REG corresponding to the CPU1 before the failure, in the register REG corresponding to the CPU2. Furthermore, the configuration control unit 400 rewrites the address conversion table 286 (FIG. 11) and assigns the CPU2 to the logical ID of 1 (L1).

In the lower side of FIG. 15, for example, the CPU0 stores the logical ID (=L1) and the transmission data SDATA in the respective areas for the CPU information TCPUID for transmission and the transmission data SDATA within the register REG corresponding to the CPU0 (denoted by (g) in FIG. 15). At that time, the CPU0 recognizes the CPU (that is, CPU2) at the transmission destination based on the logical ID instead of the physical ID (that is, P2).

The virtualization unit 280 corresponding to the CPU0 refers to the address conversion table 286 and converts the logical ID (=L0), which is contained in the CPU information CPUID indicating the transmission source, to the physical ID (=P0). In addition, the virtualization unit 280 corresponding to the CPU0 converts the logical ID (=L1), which is contained in the CPU information TCPUID indicating the transmission destination, to the physical ID (=P2) (as denoted by (h) in FIG. 15). The virtualization unit 280 corresponding to the CPU0 outputs the physical ID (=P0) indicating the CPU at the transmission source and the physical ID (=P2) indicating the CPU at the transmission destination to the internal bus IBUS together with the transmission data SDATA (as denoted by (i) in FIG. 15).

The virtualization unit 280 corresponding to the CPU2 (physical ID=P2) receives the physical ID (=P0) indicating the transmission source and the transmission data SDATA, which are transferred via the internal bus IBUS together with the physical ID (=P2) indicating the transmission destination. The virtualization unit 280 corresponding to the CPU2 converts the received physical ID (=P0) indicating the transmission source to the logical ID (=L0) in accordance with the address conversion table 286 (as denoted by (j) in FIG. 15). The virtualization unit 280 corresponding to the CPU2 stores the converted logical ID (=L0) and the received transmission data SDATA in the respective areas for the CPU information SCPUID for reception and the reception data RDATA within the register REG corresponding to the CPU2 (as denoted by (k) in FIG. 15). The CPU2 assigned with the logical ID (=L1) recognizes that the data has been transmitted via the register REG from the CPU0 assigned with the logical ID (=L0), and reads out the reception data RDATA from the register REG (as denoted by (l) in FIG. 15). As a result, in the computer system SYS0 having the virtual system ID set to 0, transfer of the data from the CPU0 assigned with the logical data (=L0) to the CPU2 assigned with the logical ID (=L1) is completed.

In both the upper side and the lower side in FIG. 15, each CPU transmits data using the logical ID and receives data using the logical ID. Therefore, even when the CPU is replaced due to a failure, each CPU may transmit and receive data without changing the setting recognized so far by the CPU.

Figure 16:
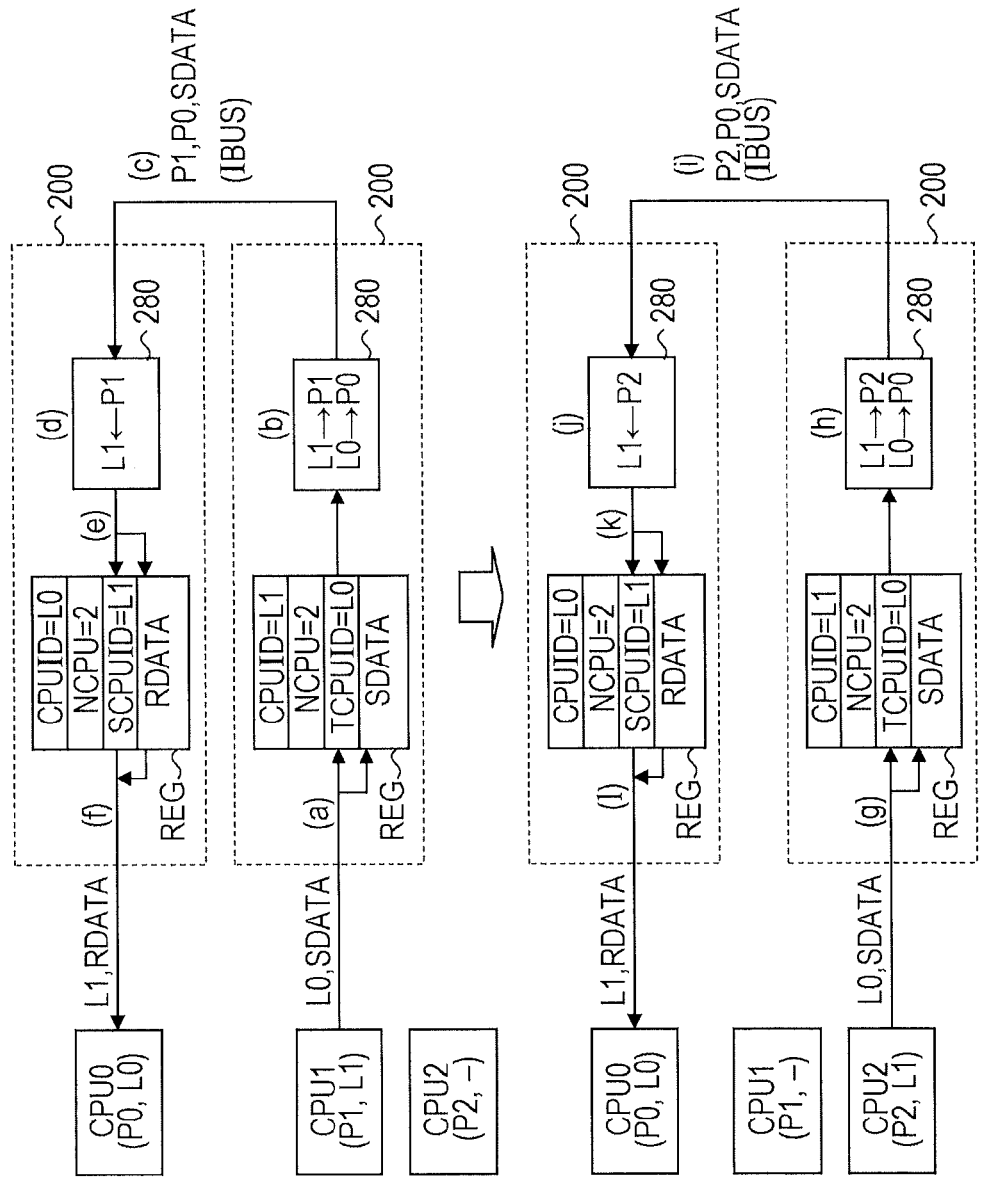
FIG. 16 illustrates another example of the operations of the CPU control unit before and after the replacement of the failed CPU with the unused CPU in the information processing apparatus illustrated in FIG. 3.

FIG. 16 illustrates another example of the operations of the CPU control unit 200 before and after the replacement of the failed CPU with the unused CPU in the information processing apparatus illustrated in FIG. 3. Detailed description of the same or similar states and operations as or to those in FIG. 15 is omitted here. As in FIG. 15, a state illustrated in the upper side of FIG. 16 represents the operation in the state illustrated in the upper side of FIG. 14, and a state illustrated in the lower side of FIG. 16 represents the operation in the state illustrated in the lower side of FIG. 14.

In the upper side of FIG. 16, for example, the CPU1 assigned with the logical data (=L1) stores the logical ID (=L0) and the transmission data SDATA in the respective areas for the CPU information TCPUID for transmission and the transmission data SDATA within the register REG corresponding to the CPU1 (denoted by (a) in FIG. 16). The virtualization unit 280 corresponding to the CPU1 converts the logical ID (=L1), which is contained in the CPU information CPUID indicating the transmission source, to the physical ID (=P1), and further converts the logical ID (=L0), which is contained in the CPU information TCPUID indicating the transmission destination, to the physical ID (=P0) (as denoted by (b) in FIG. 16). The virtualization unit 280 corresponding to the CPU1 outputs the physical ID (=P1) indicating the CPU at the transmission source and the physical ID (=P0) indicating the CPU at the transmission destination to the internal bus IBUS together with the transmission data SDATA (as denoted by (c) in FIG. 16).

The virtualization unit 280 corresponding to the CPU0 (physical ID=P0) receives the physical ID (=P1) indicating the transmission source and the transmission data SDATA, which are transferred via the internal bus IBUS together with the physical ID (=P0) indicating the transmission destination. The virtualization unit 280 corresponding to the CPU0 converts the received physical ID (=P1) indicating the transmission source to the logical ID (=L1) (as denoted by (d) in FIG. 16). The virtualization unit 280 corresponding to the CPU0 stores the converted logical ID (=L1) and the received transmission data SDATA in the respective areas for the CPU information SCPUID for reception and the reception data RDATA within the register REG corresponding to the CPU0 (as denoted by (e) in FIG. 16). The CPU0 assigned with the logical ID (=L0) reads, out from the register REG, the reception data RDATA transmitted from the CPU1 assigned with the logical ID (=L1) (as denoted by (f) in FIG. 16).

On the other hand, after the failed CPU1 has been replaced with the CPU2 (see the lower side in FIG. 16), for example, the CPU2 stores the logical ID (=L0) and the transmission data SDATA in the register REG corresponding to the CPU2 (denoted by (g) in FIG. 16). The virtualization unit 280 corresponding to the CPU2 converts the logical ID (=L1), which is contained in the CPU information CPUID indicating the transmission source, to the physical ID (=P2). In addition, the virtualization unit 280 corresponding to the CPU2 converts the logical ID (=L0), which is contained in the CPU information TCPUID indicating the transmission destination, to the physical ID (=P0) (as denoted by (h) in FIG. 16). The virtualization unit 280 corresponding to the CPU2 outputs the physical ID (=P2) indicating the CPU at the transmission source and the physical ID (=P0) indicating the CPU at the transmission destination to the internal bus IBUS together with the transmission data SDATA (as denoted by (i) in FIG. 16).

The virtualization unit 280 corresponding to the CPU0 (physical ID=P0) receives the physical ID (=P2) indicating the transmission source and the transmission data SDATA, which are transferred via the internal bus IBUS together with the physical ID (=P0) indicating the transmission destination. The virtualization unit 280 corresponding to the CPU0 converts the received physical ID (=P2) indicating the transmission source to the logical ID (=L1) in accordance with the address conversion table 286 (as denoted by (j) in FIG. 16). The virtualization unit 280 corresponding to the CPU0 stores the converted logical ID (=L1) and the received transmission data SDATA in the respective areas for the CPU information SCPUID for reception and the reception data RDATA within the register REG corresponding to the CPU0 (as denoted by (k) in FIG. 16). The CPU0 assigned with the logical ID (=L0) recognizes that the data has been transmitted via the register REG from the CPU2 assigned with the logical ID (=L1), and reads out the reception data RDATA from the register REG (as denoted by (l) in FIG. 16).

Also in FIG. 16, each CPU transmits data using the logical ID and receives data using the logical ID. Therefore, even when the CPU is replaced due to a failure, each CPU may transmit and receive data without changing the setting recognized so far by the CPU.

Figure 17:
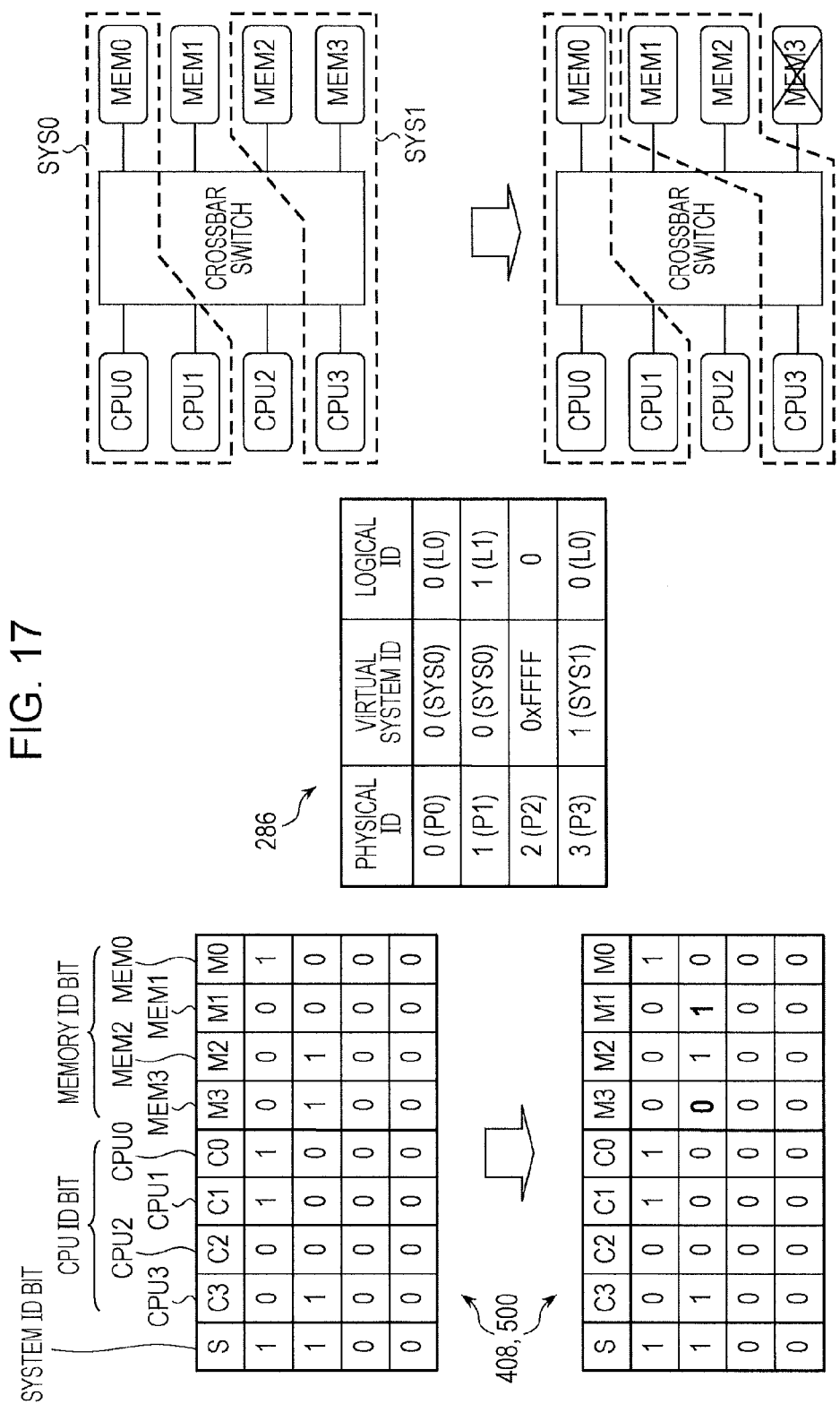
FIG. 17 illustrates an example in which a failed memory is replaced with an unused memory in the information processing apparatus illustrated in FIG. 3.

FIG. 17 illustrates an example in which a failed memory MEM is replaced with an unused memory MEM in the information processing apparatus illustrated in FIG. 3. A state illustrated in the upper side of FIG. 17 is the same as the state illustrated in FIGS. 6, 7, and 11. During the operation of the information processing apparatus 1100 in that state, the memory monitoring unit 360 (FIG. 4) corresponding to the memory MEM3 detects a failure of the memory MEM3 and outputs, to the configuration control unit 400, the failure information MEMFAIL indicating the failure of the memory MEM3.

In accordance with the failure information MEMFAIL, the configuration control unit 400 rewrites the map information table 408 in FIG. 6 as illustrated in the lower side of FIG. 17. Furthermore, in accordance with the rewritten map information table 408, the configuration control unit 400 rewrites the setting table 500 in FIG. 7 as illustrated in the lower side of FIG. 17. In the lower side of FIG. 17, rewritten values are denoted by bold fonts.

As a result, in the computer system SYS1 having the virtual system ID set to 1, the failed memory MEM3 is automatically replaced with the free memory MEM1 without resorting to manual operation. It is to be noted that, in the case of the failure of the memory MEM, the address conversion table 286 of the virtualization unit 280 illustrated in FIG. 10 is not rewritten.

Figure 18:
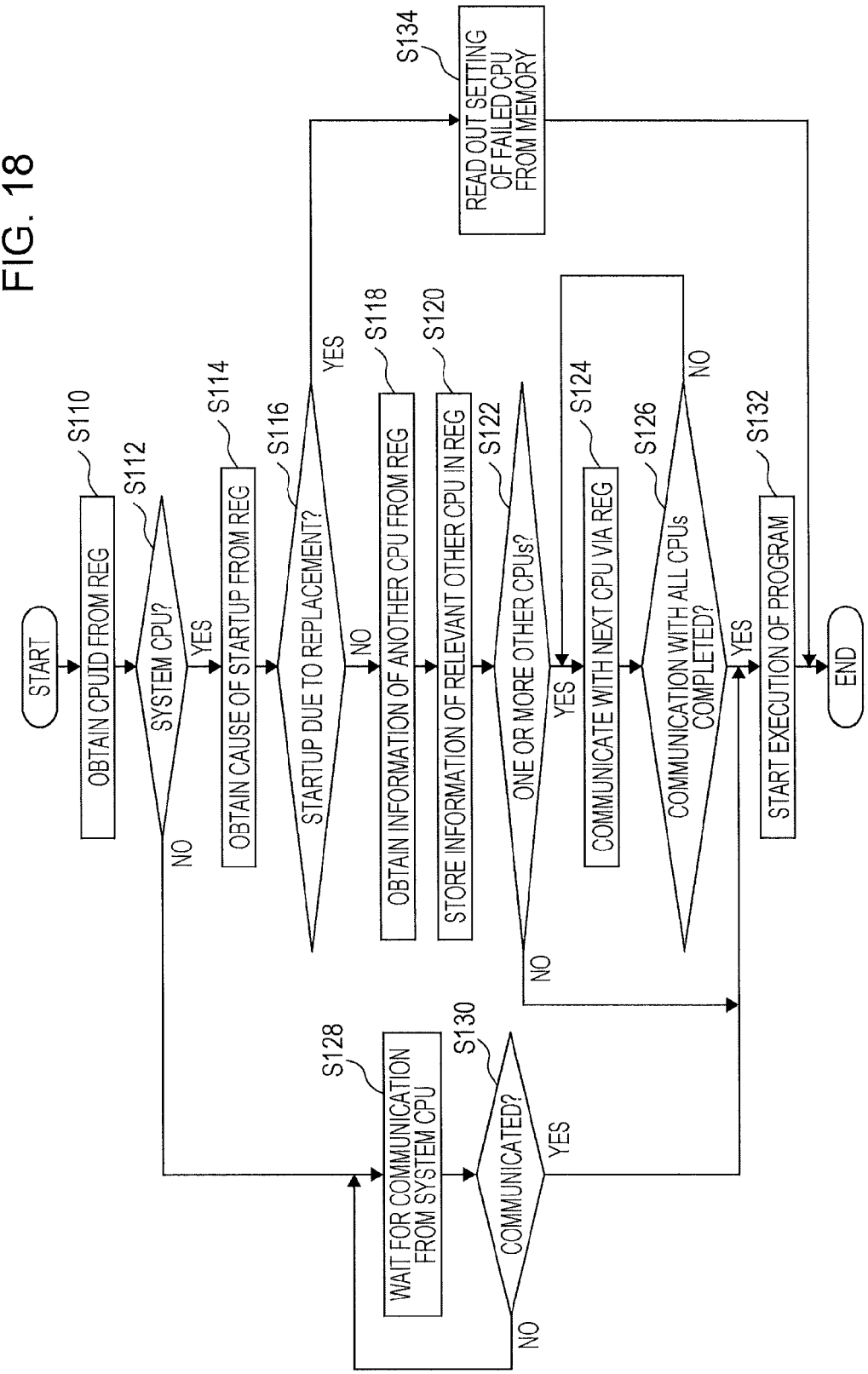

FIG. 18 illustrates an example of operations of the CPUs, illustrated in FIG. 3, upon power-on. FIG. 18 illustrates both operations of the CPU when the supply of electric power to the information processing apparatus 1100 is turned on, and the operation of the CPU that is substituted for the failed CPU. The operations illustrated in FIG. 18 are executed in an initialization routine before each CPU executes a user program for realizing the inherent function of the information processing apparatus 1100. Moreover, at the start of the operations illustrated in FIG. 18, the content of the register REG in the register I/F 240 corresponding to each CPU is set by the configuration control unit 400 illustrated in FIG. 4.

First, in step S110, the CPU supplied with the electric power reads out its own CPU information CPUID from the register REG in the register I/F 240 illustrated in FIG. 9. Next, in step S112, the CPU determines, based on the CPU information CPUID read out from the register REG, whether it is the system CPU managing the entire computer system. For example, the CPU having the CPU information CPUID set to "0" recognizes that it is the system CPU. If the CPU is the system CPU, the process shifts to step S114, and if the CPU is not the system CPU, the process shifts to step S128. In each of computer systems constructed with different virtual system IDs, as illustrated in FIG. 11, the CPU having the virtual ID of 0 is the system CPU.

In step S114, the system CPU refers to the reason bit R in the register REG and obtains the cause of the startup of the CPU. Next, in step S116, the system CPU determines, based on a value of the reason bit R, whether the cause of the startup is replacement due to a failure of another CPU. If the cause of the startup is the replacement, the process shifts to step S134, and if the cause of the startup is not the replacement, that is, if the supply of electric power to the information processing apparatus 1100 is turned on, the process shifts to step S118.

In step S118, the system CPU refers to the CPU number information NCPU in the register REG and recognizes the number of CPUs, which belong to the computer system, including itself. Furthermore, the system CPU accesses the address conversion table 286 in the virtualization unit 280 via the register I/F 240 and obtains the information (such as the physical ID and the logical ID) of another CPU included in the computer system to which the system CPU belongs. In step S118, the system CPU may further obtain, via the register I/F 240, the capacity of the memory MEM assigned to itself and the types and the number of input/output (I/O) devices connected itself. In step S118, the system CPU may recognize, via the register I/F 240, whether the other CPU included in the computer system, to which the system CPU belongs, has been started up. Next, in step S120, the system CPU stores the information, obtained in step S118, into the corresponding register REG. Of the information obtained in step S118, the information for which a storage area is not assigned in the register REG may be stored in the memory MEM.

Next, in step S122, the system CPU determines, based on the information obtain in step S118, whether there is one or more other CPUs included in the computer system to which the system CPU belongs. If there is one or more other CPUs, the process shifts to step S124, and if there is no other CPU, the process shifts to step S132.

In step S124, the system CPU communicates with another one CPU by employing the register REG in the register I/F 240. For example, when the flag B indicates the ready state, the system CPU writes one logical ID of the other CPU into the area for the CPU information TCPUID for transmission within the register REG illustrated in FIG. 9, and writes information indicating the start of communication in the area for the transmission data SDATA therein. The system CPU determines the completion of the communication with the other one CPU by monitoring that the flag B having been set to the busy state with the writing of the CPU information TCPUID and the transmission data SDATA into the register REG is reset to the ready state.

Next, in step S126, the system CPU determines whether the communication with all other CPUs included in the computer system, to which the system CPU belongs, is completed. If the communication with all other CPUs is completed, the process shifts to step S132, and if the communication with all other CPUs is not yet completed, the process returns to step S124.

If the CPU is not the system CPU (that is, it is another CPU), the other CPU monitors the flag V in the register REG and waits for the communication from the system CPU in step S128. Next, in step S130, the other CPU determines whether the flag V is set. If the flag V is set, the other CPU determines whether the information indicating the start of communication has been received from the system CPU. If the information indicating the start of communication has been received, the process shifts to step S132, and if the flag V is not set, the process returns to step S128.

When the other CPU is able to utilize the flag I in the register REG, the other CPU may recognize reception of the information indicating the start of communication by generating an interrupt request. In such a case, the other CPU executes a process of waiting for the generation of the interrupt request in step S128, and determines in step S130 whether received data represents the information indicating the start of communication.

In step S132, the system CPU and the other CPU start to execute the user program in accordance with tasks distributed by the OS in the system CPU. The operation of each CPU at the power-on is completed upon the start of the user program.

On the other hand, if the cause of the startup is the replacement due to a failure of the system CPU, the communication between (among) the CPUs in the computer system is already established. In step S134, therefore, another CPU going to be a new system CPU reads out the information, which has been managed by the failed system CPU (OS), from the memory MEM. For example, the new system CPU reads out, from the memory MEM, the capacity of each memory MEM included in the computer system and the head address of a queue that is used by the system CPU to take out the task for realizing the user program. Through step S134, the new system CPU substituted for the failed system CPU is made able to execute operations equivalent to those executable by the failed system CPU.

FIG. 19 illustrates an example of the operation of the configuration control unit 400 illustrated in FIG. 5. The operation illustrated in FIG. 19 is realized, for example, with a processor in the configuration control unit 400 executing a control program.

First, in step S210, the configuration control unit 400 reads out an initial value from a nonvolatile memory device, such as a ROM, incorporated therein, and sets the map information table 408 to an initial state in accordance with the read-out initial value. For example, the initial state of the map information table 408 is as per illustrated in FIG. 6.

Next, in step S212, the configuration control unit 400 controls the rewrite unit 410, illustrated in FIG. 5, in accordance with the map information table 408 having been set to the initial state, and sets the setting table 500 to an initial state. Furthermore, the configuration control unit 400 controls the rewrite unit 412, illustrated in FIG. 5, in accordance with the map information table 408 having been set to the initial state, and sets the address conversion table 286 in the virtualization unit 280 to an initial state. For example, the initial state of the setting table 500 is as per illustrated in FIG. 7, and the initial state of the address conversion table 286 is as per illustrated in FIG. 11.

Next, in step S214, the configuration control unit 400 sets the CPU information CPUID and the CPU number information NCPU in the register REG of each register I/F 240 in accordance with the map information table 408. The setting of the CPU information CPUID and the CPU number information NCPU is executed via the virtualization unit 280 illustrated in FIG. 4.

Next, in step S216, the configuration control unit 400 turns on the supply of electric power to one or more CPUs (active CPUs) and one or more memories MEM (active memories), which are operated as one or more computer systems, in accordance with the map information table 408.

In the example illustrated in FIG. 6, the electric power is supplied to the CPU0, the CPU1, and the CPU3 for each of which the CPU ID bit C is set to "1", and to the MEM0, the MEM2, and the MEM3 for each of which the memory ID bit M is set to "1", those CPUs and memories MEM belonging to two rows in the map information table 408 where the system ID bit S is set to "1". With the power-on, the CPUs operating in the computer system start the operation illustrated in FIG. 18, thereby starting the execution of the user program. Stated in another way, after the execution of step S216, each computer system operates, for example, as one of control devices for controlling various sensors or one of relay devices in communication equipment.

Next, in step S218, the configuration control unit 400 monitors the failure information CPUFAIL from the CPU monitoring unit 260 and the failure information MEMFAIL from the memory monitoring unit 360, those monitoring units being illustrated in FIG. 4. Next, in step S220, the configuration control unit 400 determines, based on the failure information CPUFAIL, whether a failure of some CPU has occurred, and determines, based on the failure information MEMFAIL, whether a failure of some memory MEM has occurred. If a failure of some CPU or memory MEM has occurred, the process shifts to, step S222, and if no failure occurs in any CPU or memory MEM, the process returns to step S218 to continue the monitoring of the failure information CPUFAIL and MEMFAIL.

If the failure of some CPU is detected in step S222, the process of the configuration control unit 400 shifts to step S224, and if the failure of any CPU is not detected, the configuration control unit 400 determines that the failure of the memory MEM has occurred, and then shifts to step S232.

If the failure of some CPU has occurred, the configuration control unit 400 refers to the map information table 408 illustrated in FIG. 6 and determines in step S224 whether there is at least one unused CPU. The unused CPU is given as a CPU in the map information table 408 for which all the CPU ID bits C are set to "0" in all rows where the system ID bit S is set to "1". In the map information table 408 illustrated in FIG. 6, for example, the unused CPU is the CPU2. If there is at least one unused CPU, the process shifts to step S226, and if there is no unused CPU, the process shifts to step S246.

In step S226, the configuration control unit 400 updates the map information table 408 and selects one unused CPU to be substituted for the failed CPU. The configuration control unit 400 changes the map information table 408, for example, from the state illustrated in the upper side of FIG. 14 to the state illustrated in the lower side of FIG. 14. If there are plural unused CPUs, the CPU having the smallest ID number, for example, is selected.

Next, in step S228, the configuration control unit 400 updates the CPU information CPUID in the register REG of each CPU control unit 200 in accordance with the updated map information table 408. Furthermore, the configuration control unit 400 updates the address conversion table 286 in the virtualization unit 280 of each CPU control unit 200. The configuration control unit 400 changes the address conversion table 286, for example, from the state illustrated in the upper side of FIG. 14 to the state illustrated in the lower side of FIG. 14.

Next, in step S230, the configuration control unit 400 controls the power control unit 414, illustrated in FIG. 5, to turn on the supply of electric power to the unused CPU that is substituted for the failed CPU.

On the other hand, if the failure of some memory MEM has occurred, the configuration control unit 400 determines in step S232, based on the failure information MEMFAIL from the memory monitoring unit 360, whether the failure is caused by a correctable error. If the failure is caused by a correctable error, the process shifts to step S234 because the memory MEM may hold correct data. If the failure is caused by an error that is difficult to correct, the process shifts to step S246 because of a possibility that the data held in the memory MEM may be lost.

In step S234, the configuration control unit 400 refers to the map information table 408 and determines whether there is at least one unused memory MEM. The unused memory MEM is given as a memory MEM in the map information table 408 for which all the memory ID bits M are set to "0" in all rows where the system ID bit S is set to "1". In the map information table 408 illustrated in FIG. 6, for example, the unused memory MEM is the memory MEM1. If there is at least one unused memory MEM, the process shifts to step S236, and if there is no unused memory MEM, the process shifts to step S246.

In step S236, the configuration control unit 400 updates the map information table 408 and selects one unused memory MEM to be substituted for the failed memory MEM. The configuration control unit 400 changes the map information table 408, for example, from the state illustrated in the upper side of FIG. 17 to the state illustrated in the lower side of FIG. 17. If there are plural unused memories MEM, the memory MEM having the smallest ID number, for example, is selected.

Next, in step S238, the configuration control unit 400 controls the power control unit 414, illustrated in FIG. 5, to turn on the supply of electric power to the unused memory MEM that is substituted for the failed memory MEM Next, in step S240, the configuration control unit 400 copies the data, stored in the failed memory MEM, into the unused memory MEM to be substituted for. The copying operation between the memories MEM is executed, for example, using a signal line connected between the configuration control unit 400 and each of the memories MEM. When the configuration control unit 400 includes a direct memory access controller (DMAC), the copying operation between the memories MEM may be executed using the DMAC.

Alternatively, the copying operation between the memories MEM may be executed via the CPU control unit 200, the crossbar switch 700, and the memory control unit 300. In such a case, before updating the setting table 500 in step S242 described later, the configuration control unit 400 reads out the data stored in the failed memory MEM and holds the read-out data in the memory device inside the system controller 100. Furthermore, after updating the setting table 500 in step S242, the configuration control unit 400 writes the data, held in the memory device inside the system controller 100, into the unused memory MEM that has been newly assigned. The copying operation between the memories MEM via the CPU control unit 200, the crossbar switch 700, and the memory control unit 300 may be executed by the CPU in the computer system including the failed memory MEM. Thereafter, the process shifts to step S242.

In step S242, the configuration control unit 400 updates the setting table 500, illustrated in FIG. 7, in accordance with the updated map information table 408. The configuration control unit 400 changes the setting table 500, for example, from the state illustrated in the upper side of FIG. 14 to the state illustrated in the lower side of FIG. 14, or from the state illustrated in the upper side of FIG. 17 to the state illustrated in the lower side of FIG. 17. With the update of the setting table 500, the failed CPU is disconnected from the computer system, and the unused CPU to be substituted for the failed CPU is connected to the computer system. Alternatively, with the update of the setting table 500, the failed memory MEM is disconnected from the computer system, and the unused memory MEM to be substituted for the failed memory MEM is connected to the computer system.

Next, in step S244, the configuration control unit 400 turns off the supply of electric power to the failed CPU or the failed memory MEM in accordance with the updated map information table 408.

On the other hand, if there is no unused CPU, or if there is no unused memory MEM, or if an uncorrectable error has occurred in the memory MEM, the configuration control unit 400 notifies, in step S246, an upper-level device of the fact that a system error has occurred in the computer system.

In this embodiment, as in the above-described embodiment, the setting of the CPUs in the computer system SYS is maintained before and after the replacement of some CPU due to a failure, and the communication between the CPUs is continued through the same procedures before and after the replacement of the CPU. Moreover, since the failed CPU is automatically replaceable with the unused CPU without resorting control and manipulation applied from the outside, reliability of the information processing apparatus 1100 is improved in comparison with that of the related art.

For example, when the failed CPU is replaced with the unused CPU, the configuration control unit 400 rewrites the address conversion table 286 in accordance with the determination by the map determination unit 406 such that the communication between the CPUs may be continued through the same procedures before and after the replacement of the CPU. Furthermore, since the address conversion table 286 (FIG. 11) has the area for the virtual system ID to individually identify plural computer systems from each other, the plural computer systems may be constructed in the information processing apparatus 1100.

Since the supply of electric power to the unused or failed CPU is turned off by the power control unit 414 (FIG. 5) in the configuration control unit 400, power consumption by the information processing apparatus 1100 is reduced in comparison with that in the case of not turning off the supply of electric power.

In addition, since the address conversion unit 284 (FIG. 10) is disposed between the flip-flops FF2 and FF4, the converted physical ID is output to the internal bus IBUS without being delayed relative to the transmission data SDATA regardless of the time that is taken for the conversion operation executed by the address conversion unit 284.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:
a plurality of arithmetic processing devices each configured to execute arithmetic operations;
a plurality of storage devices each configured to store data;
a switch unit configured to connect some of the plural arithmetic processing devices and some of the plural storage devices in accordance with connection information, and to construct a system;
a storage unit configured to store correlation information indicating correspondence between physical information that individually identifies the plural arithmetic processing devices, and logical information that identifies each of the plural arithmetic processing devices in the system;
a first control unit disposed corresponding to each of the plural arithmetic processing devices, the first control unit being configured to, when the corresponding arithmetic processing device transmits data to the arithmetic processing device at a transmission destination, output physical information converted from the logical information of the arithmetic processing device at the transmission destination and the physical information of the corresponding arithmetic processing device via a transfer path in accordance with the correlation information;

a second control unit configured to change the connection information in response to occurrence of a failure of some arithmetic processing device in the system, and to control the switch unit such that the failed arithmetic processing device is replaced with another one included in the plural arithmetic processing devices; and a third control unit configured to, in response to the occurrence of the failure, invalidate the correlation information that includes the logical information corresponding to the physical information of the failed arithmetic processing device, and to set correspondence between the physical information of the other arithmetic processing device and the logical information contained in the invalidated correlation information.

2. The information processing apparatus according to claim 1, wherein the first control unit, when the corresponding arithmetic processing device receives data from the arithmetic processing device at a transmission source, output logical information converted from the physical information of the arithmetic processing device at the transmission source to the corresponding arithmetic processing device, the logical information being received from the arithmetic processing device at the transmission source via the transfer path in accordance with the correlation information.

3. The information processing apparatus according to claim 2, wherein the first control unit comprises:

a separating unit configured to separate the data received from the corresponding arithmetic processing device and the logical information of the arithmetic processing device at the transmission destination from each other;

a conversion unit configured to convert the logical information of the arithmetic processing device at the transmission destination, which has been separated by the separating unit, to the physical information; and a combining unit configured to combine the physical information converted by the conversion unit with the data separated by the separating unit, and to output combined information via the transfer path.

4. The information processing apparatus according to claim 3, further comprising:

a first latch and a second latch disposed in series between the separating unit and the combining unit, and configured to successively latch the data separated by the separating unit in synchronism with a clock;

a third latch disposed between the separating unit and the conversion unit, and configured to latch the logical information of the arithmetic processing device at the transmission destination, which has been separated by the separating unit, in synchronism with the clock; and a fourth latch disposed between the conversion unit and the combining unit, and configured to latch the physical information, which has been converted by the conversion unit, in synchronism with the clock, wherein the conversion unit converts the logical information of the arithmetic processing device at the transmission destination to the physical information within one cycle of the clock.

5. The information processing apparatus according to claim 2, wherein the second control unit includes a selection unit configured to, in response to the occurrence of the failure, select the other arithmetic processing device, which is to be substituted for the failed arithmetic processing device, from one or more unused arithmetic processing devices, and to change the connection information in accordance with a selection result, and the third control unit rewrites the storage unit in accordance with the connection information changed by the selection unit.

6. The information processing apparatus according to claim 2, further comprising a fourth control unit configured to turn off supply of electric power to the unused arithmetic processing device and the failed arithmetic processing device, and to supply electric power to the arithmetic processing device and the storage device, which are operated in the system, in accordance with the connection information.

7. The information processing apparatus according to claim 2, wherein the storage unit has, in one-to-one relation to the plural arithmetic processing devices, an area to store the physical information, an area to store system information that identifies the system, and an area to store the logical information for each system identified by the system information.

8. The information processing apparatus according to claim 3, further comprising a first detection unit configured to detect the failure of the arithmetic processing device in the system, wherein the second control unit changes the connection information in response to detection of the failure of the arithmetic processing device by the first detection unit.

9. The information processing apparatus according to claim 3, further comprising a second detection unit configured to detect the failure of the storage device in the system, wherein the second control unit changes the connection information in response to detection of the failure of the storage device by the second detection unit, and to control the switch unit such that the failed storage device is replaced with another storage device included in the plural storage devices.

10. A control method for an information processing apparatus comprising a plurality of arithmetic processing devices each configured to execute arithmetic operations, a plurality of storage devices each configured to store data, a switch unit configured to connect some of the plural arithmetic processing devices and some of the plural storage devices in accordance with connection information, and to construct a system, and a storage unit configured to store correlation information indicating correspondence between physical information that individually identifies the plural arithmetic processing devices, and logical information that identifies each of the plural arithmetic processing devices in the system, the control method comprising:

instructing a first control unit disposed corresponding to each of the plural arithmetic processing devices to, when the corresponding arithmetic processing device transmits data to the arithmetic processing device at a transmission destination, output physical information converted from the logical information of the arithmetic processing device at the transmission destination and the physical information of the corresponding arithmetic processing device via a transfer path in accordance with the correlation information;

instructing the first control unit to, when the corresponding arithmetic processing device receives data from the arithmetic processing device at a transmission source, output logical information converted from the physical information of the arithmetic processing device at the transmission source to the corresponding arithmetic processing device, the logical information being received from the arithmetic processing device at the transmission source via the transfer path in accordance with the correlation information;

instructing a second control unit included in the information processing apparatus to change the connection information in response to occurrence of a failure of some arithmetic processing device in the system, and to control the switch unit such that the failed arithmetic processing device is replaced with another one included in the plural arithmetic processing devices; and instructing a third control unit included in the information processing apparatus to, in response to the occurrence of the failure, invalidate the correlation information that includes the logical information corresponding to the physical information of the failed arithmetic processing device, and to set correspondence between the physical information of the other arithmetic processing device and the logical information contained in the invalidated correlation information.

* * * * *